(12) United States Patent
Doi et al.

(10) Patent No.: US 8,783,436 B2
(45) Date of Patent: Jul. 22, 2014

(54) MONEY HANDLING SYSTEM AND MONEY HANDLING METHOD

(75) Inventors: Kazuhiro Doi, Himeji (JP); Minoru Higashiyama, Himeji (JP); Kenichi Tagashira, Himeji (JP); Keiju Nakagawa, Tatsuno (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 0 days.

(21) Appl. No.: 13/575,850

(22) PCT Filed: Jan. 26, 2011

(86) PCT No.: PCT/JP2011/051457
§ 371 (c)(1),
(2), (4) Date: Sep. 25, 2012

(87) PCT Pub. No.: WO2011/093318
PCT Pub. Date: Aug. 4, 2011

(65) Prior Publication Data
US 2013/0015036 A1 Jan. 17, 2013

(30) Foreign Application Priority Data

Jan. 29, 2010 (JP) ................... 2010-018726
Jan. 29, 2010 (JP) ................... 2010-018756

(51) Int. Cl.
*G07F 7/04* (2006.01)

(52) U.S. Cl.
USPC ........................................... 194/206

(58) Field of Classification Search
USPC .......... 194/206, 215, 302, 344, 350; 406/3, 4, 406/10, 12; 705/16, 17, 21; 235/379; 209/534
See application file for complete search history.

(56) References Cited

U.S. PATENT DOCUMENTS

| 3,949,364 A * | 4/1976 | Clark et al. ................... 235/375 |
| 4,470,730 A | 9/1984 | Wuthrich |
| 5,092,714 A | 3/1992 | Porter et al. |

FOREIGN PATENT DOCUMENTS

| EP | 0 034 940 A1 | 9/1981 |
| EP | 0 690 423 A2 | 1/1996 |
| JP | 56-31165 | 3/1981 |
| JP | 56-33318 | 4/1981 |
| WO | WO99/10845 A1 | 3/1999 |

OTHER PUBLICATIONS

European Search Report (Application No. 117370312—PCT/JP2011/051457) (4 pages—dated Aug. 29, 2013).

* cited by examiner

*Primary Examiner* — Mark Beauchaine
(74) *Attorney, Agent, or Firm* — Renner, Kenner, Greive, Bobak, Taylor & Weber

(57) ABSTRACT

A recognition machine 40, 90 connected to a pneumatic tube 14 is provided separately from a money change machine 20, 70. The recognition machine 40, 90 includes a recognition unit 46, 96 configured to recognize a paper sheet or a coin having been put thereinto, and a storing mechanism 48, 98 configured to store the paper sheet or the coin having been recognized by the recognition unit 46, 96, into a storing member for pneumatic tube 16 to be transported by a pneumatic tube 14. A control unit 60, 100 is configured to calculate a deposit amount of the paper sheet or the coin, by adding up information relating to the paper sheet or the coin stored in the money change machine 20, 70 and information relating to a paper-sheet recognition result or coin recognition result by the recognition unit 46, 96 of the recognition machine 40, 90.

13 Claims, 20 Drawing Sheets

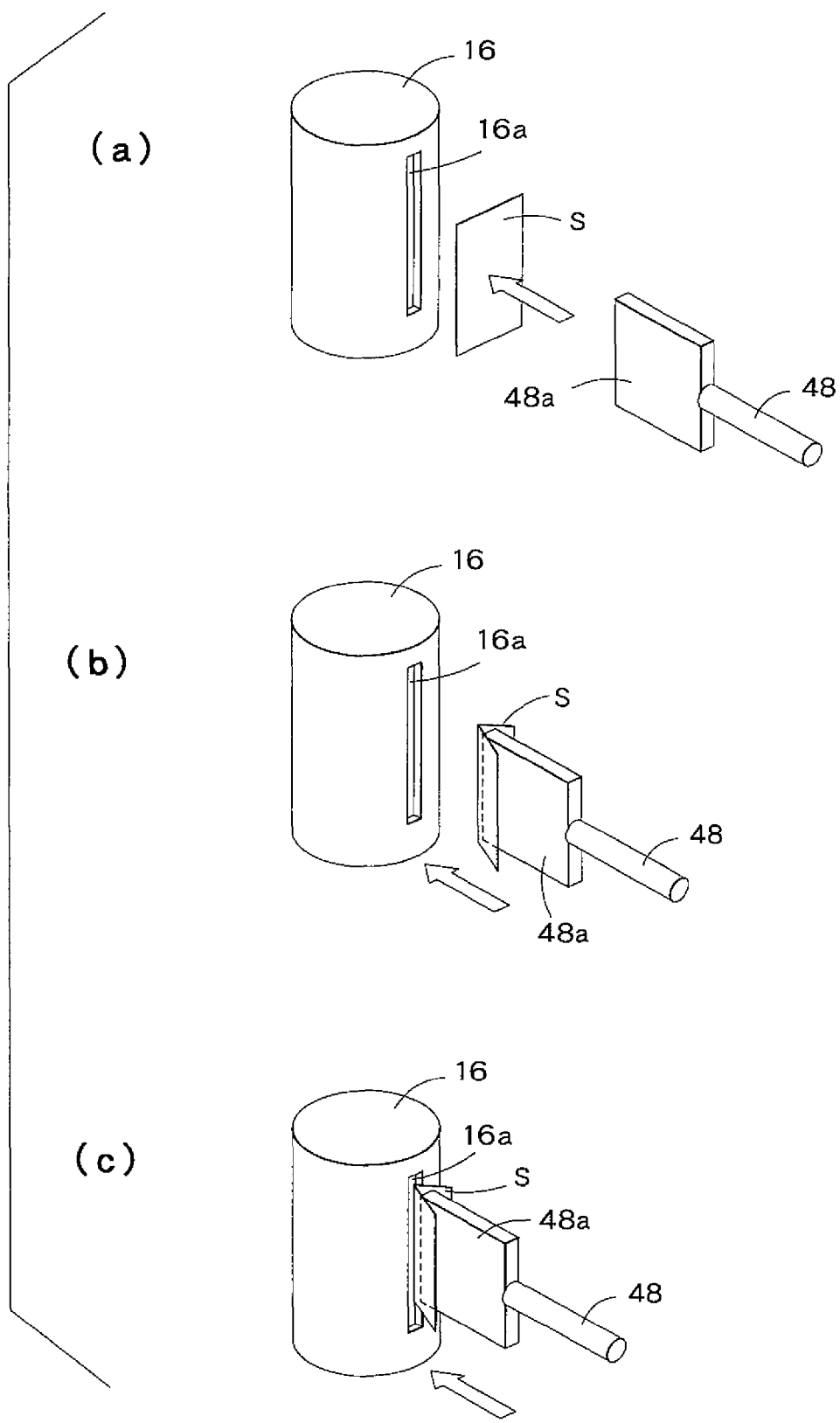
F I G. 4

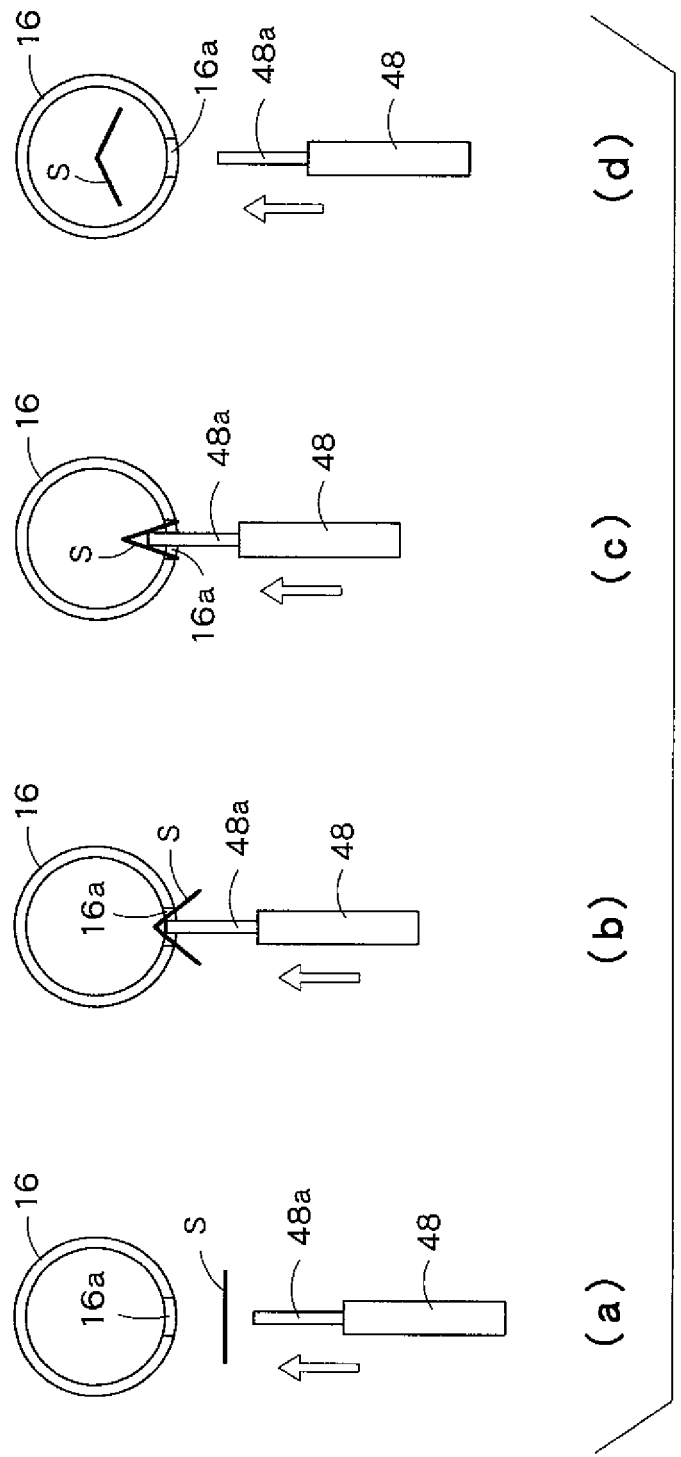
F I G. 5

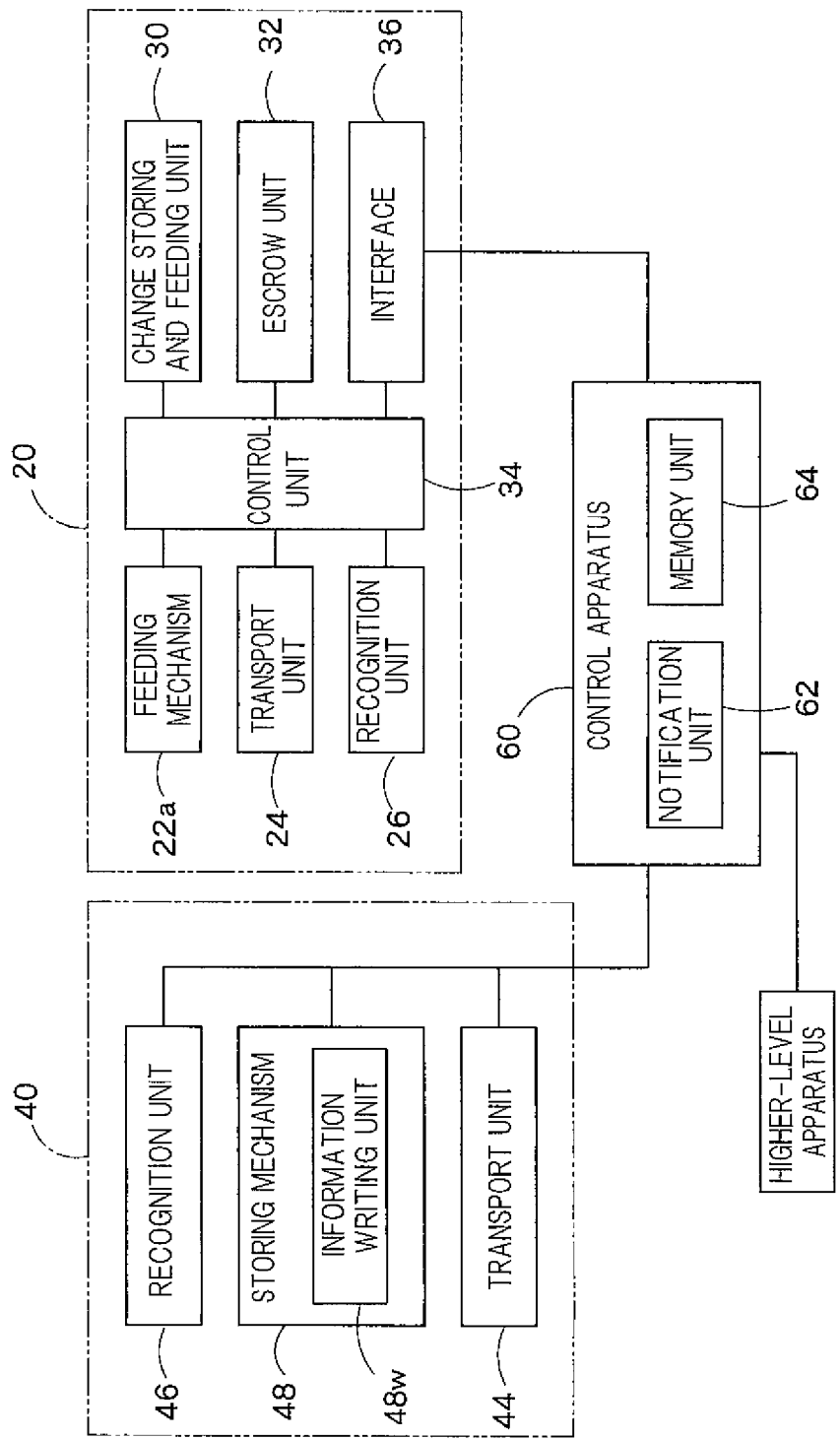
F I G. 6

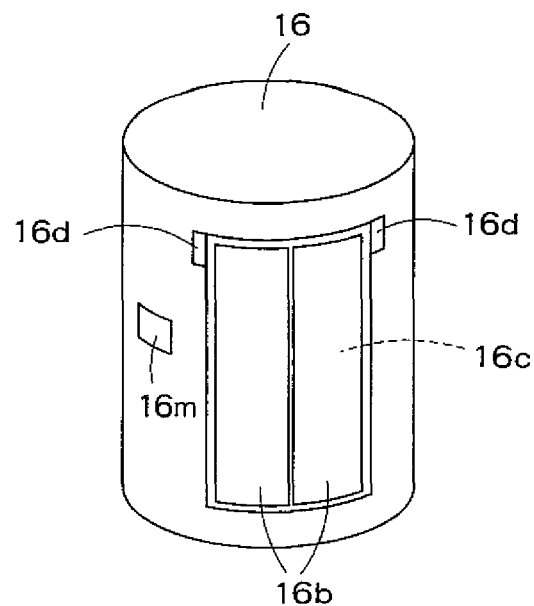
F I G. 11
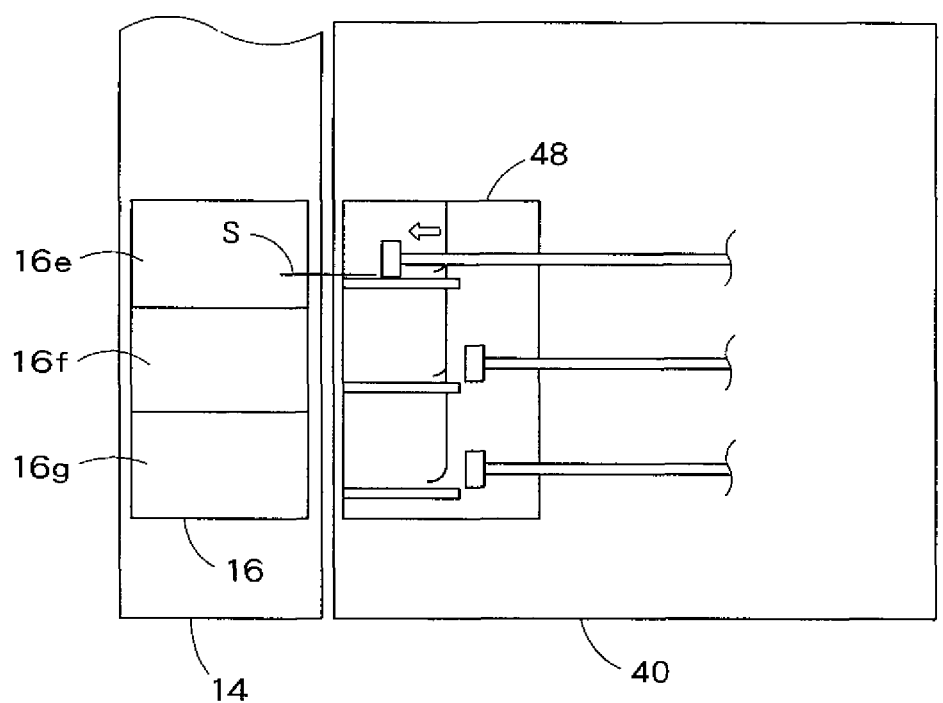
F I G. 12

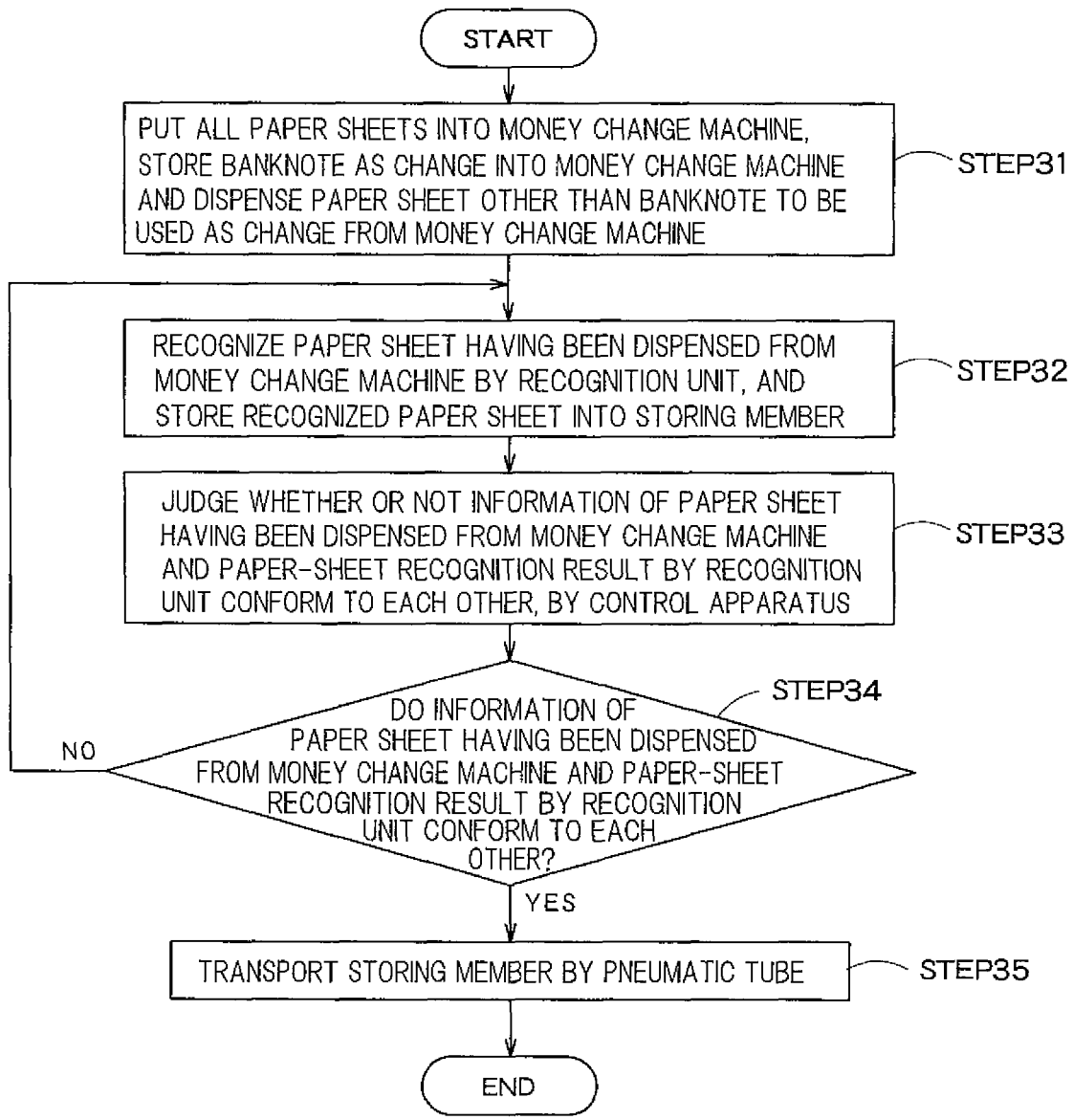
F I G. 13

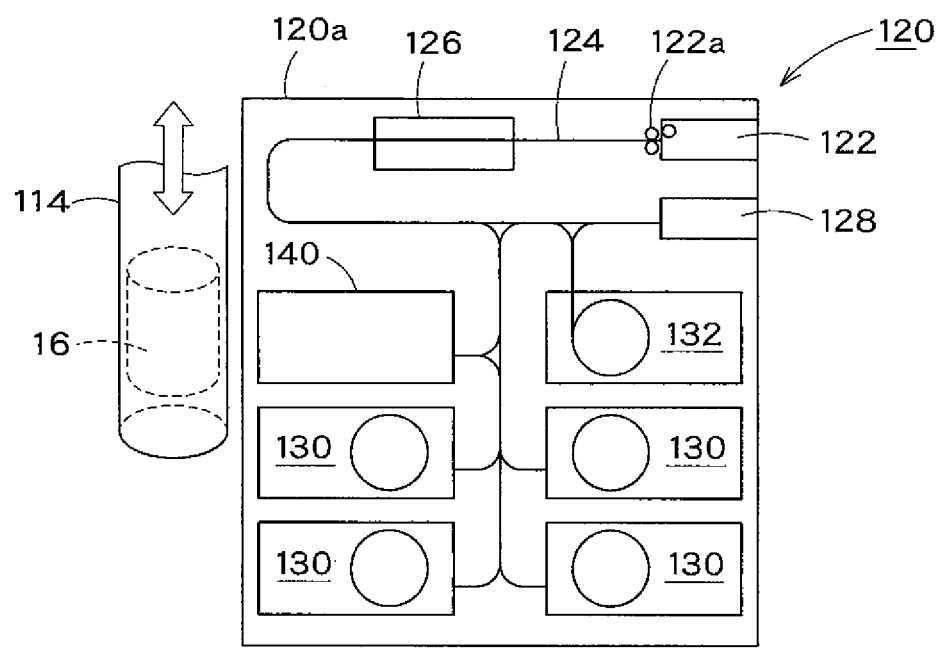
F I G. 17

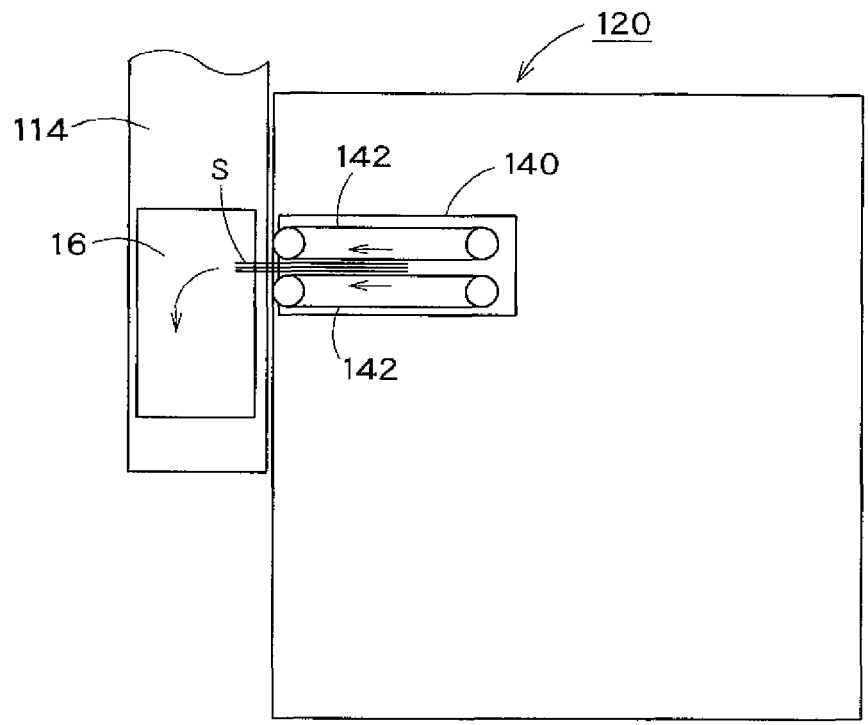
F I G. 18
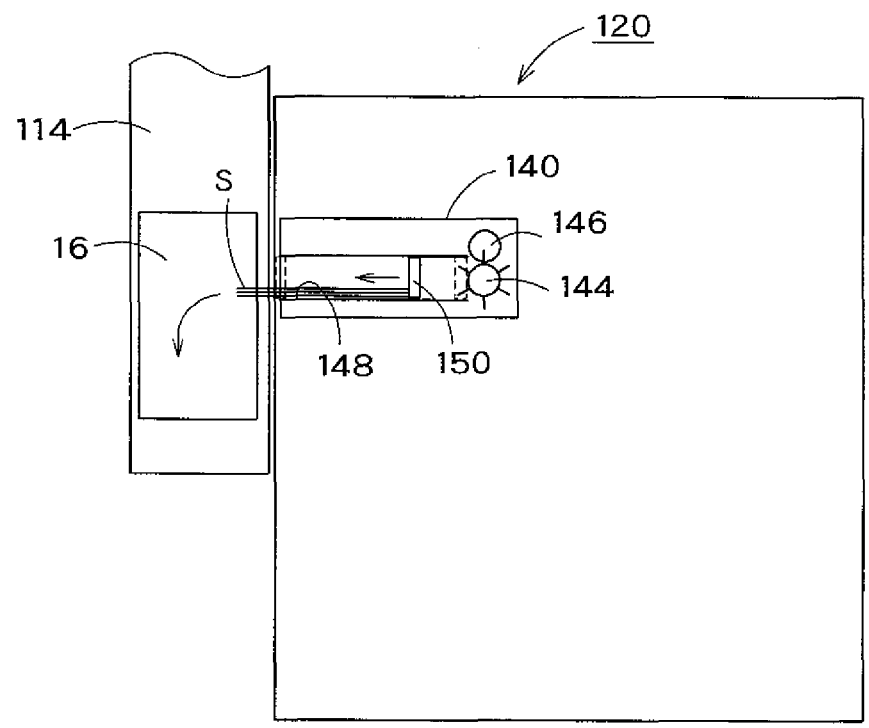
F I G. 19

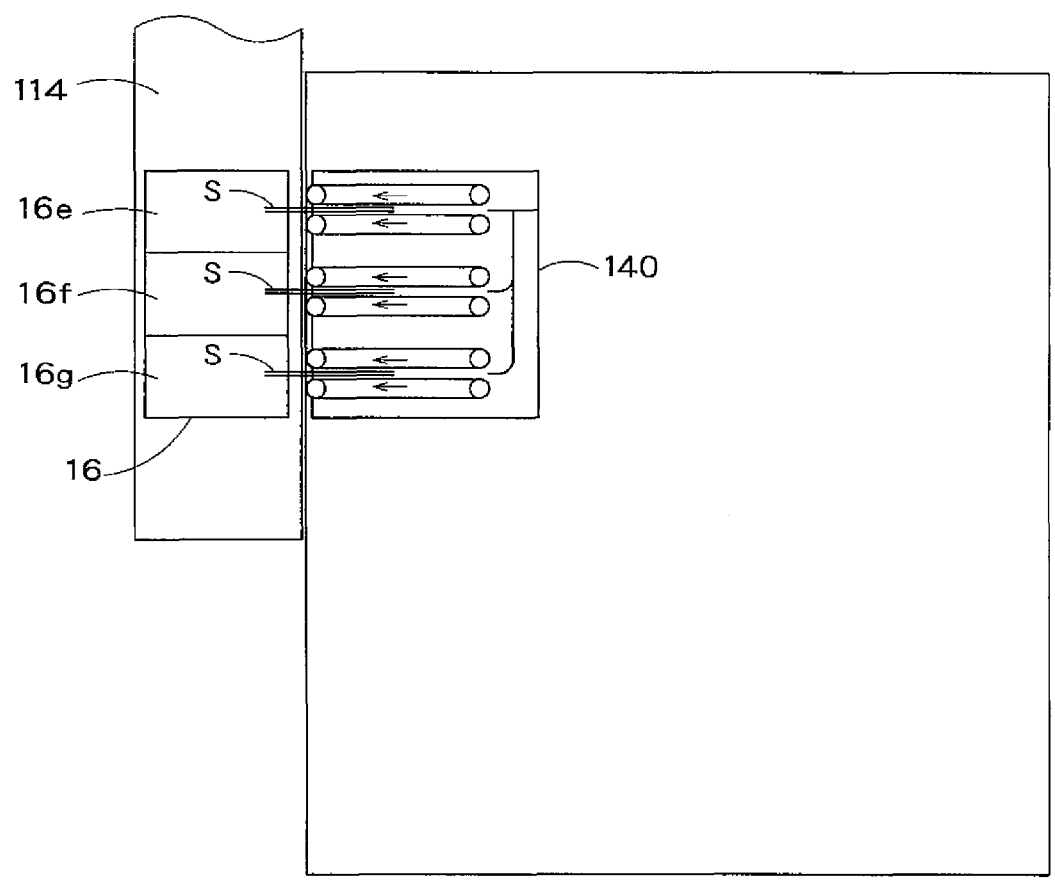
F I G. 23
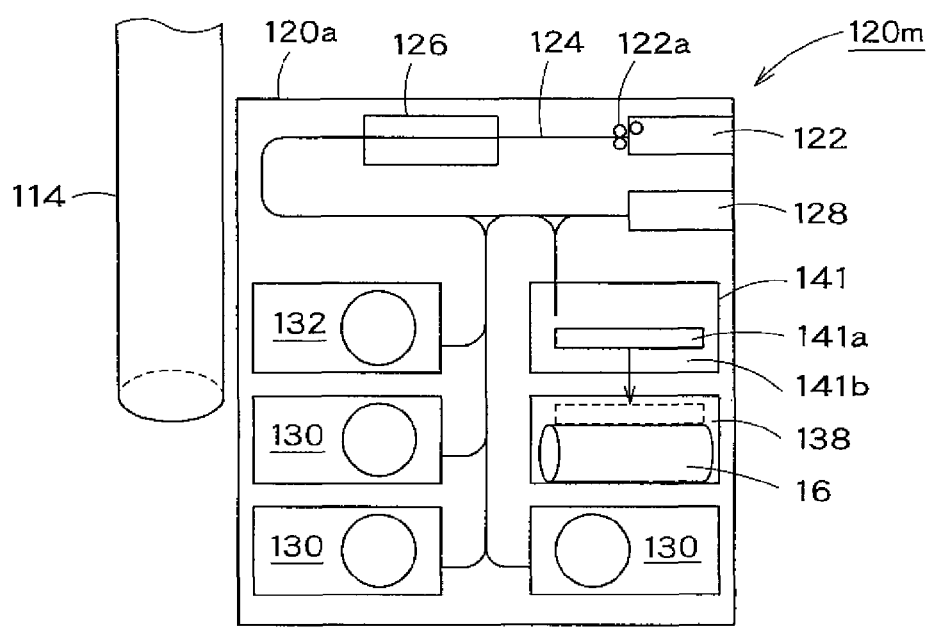
F I G. 24

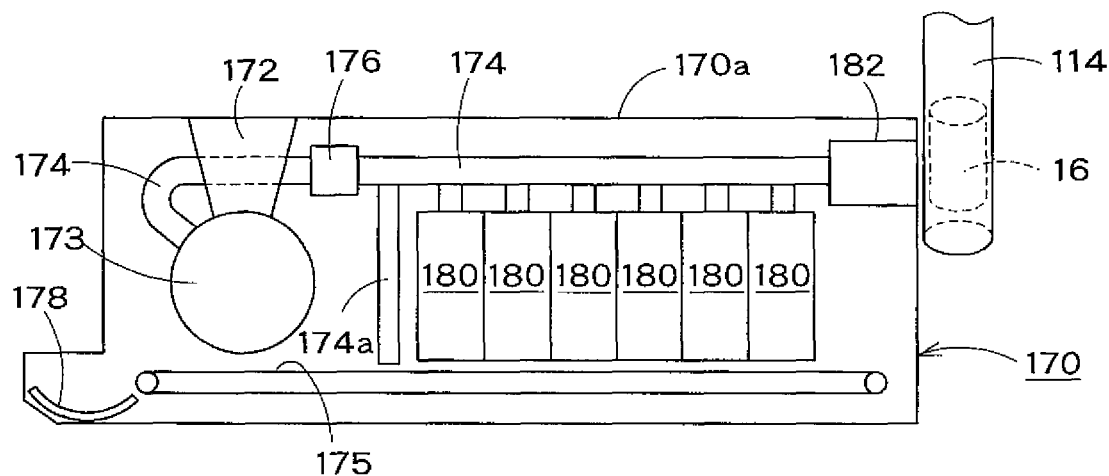
F I G. 25
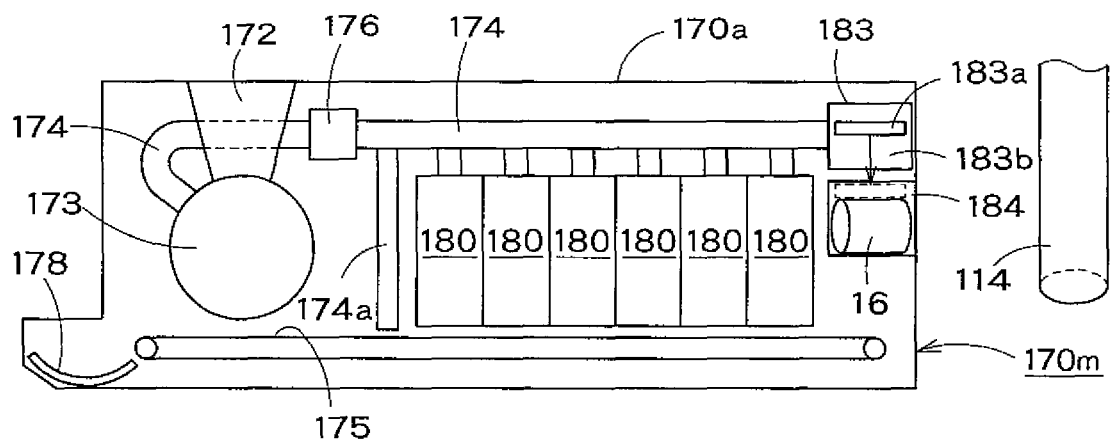
F I G. 26

MONEY HANDLING SYSTEM AND MONEY HANDLING METHOD

CROSS-REFERENCE TO RELATED APPLICATION

This application is a National Phase filing of PCT Application No. PCT/JP2011/051457 filed on Jan. 26, 2011 which claims priority from prior Japanese Patent Application Nos. 2010-018726 and 2010-018756 filed on Jan. 29, 2010, the entire contents of which are incorporated by reference.

FIELD OF THE INVENTION

The present invention relates to a money handling system including a money change machine, a recognition machine separately provided from this money change machine, and a pneumatic tube, and a money handling method.

BACKGROUND ART

There has been conventionally known a pneumatic tube in which a paper sheet, such as a banknote or a valuable document, or a coin is stored into a cylindrical storing member, the storing member storing the paper sheet or the coin is put into an air tube, and the storing member is transported in the air tube by means of a pneumatic pressure. For example, EP0 034 940A1 discloses a pneumatic tube for transporting money, which has been handled by a cash register installed in a store such as a supermarket and the like, to a cash room spaced apart from the cash register.

DISCLOSURE OF THE INVENTION

In a case where such a pneumatic tube is used, when money is deposited by the cash register, a small denomination banknote and so on, which is used as a change in the cash register, is kept in the cash register. On the other hand, a large denomination banknote and so on, which is not used as a change, is transported by the pneumatic tube from the cash register to the cash room, and the large denomination banknote is collected in the cash room.

However, when the above operation is performed, it is desired that amount-of-money data of the money stored as a change in the cash register and amount-of-money data of the money to be transported to the cash room by the pneumatic tube are reliably managed.

The present invention has been made in view of the above circumstances. The object of the present invention is to provide a money handling system and a money handling method that can reliably manage amount-of-money data of money and so on which are stored as a change in a money change machine, and amount-of-money data of a money and so on which are to be transported by a pneumatic tube to an apparatus other than the money change machine.

The present invention is a money handling system including: a money change machine including a housing, an inlet for putting a paper sheet from the outside of the housing to the inside thereof, a transport unit disposed inside the housing and configured to transport the paper sheet having been put into the housing through the inlet, a first recognition unit disposed on the transport unit and configured to recognize the paper sheet having been put into the housing through the inlet, a change storing and feeding unit disposed inside the housing and configured to store, as a change, a banknote of a specific denomination among the paper sheet having been recognized by the first recognition unit, and to feed out the stored banknote to the transport unit, and an outlet connected to the transport unit, for dispensing a paper sheet from the inside of the housing to the outside thereof; a pneumatic tube configured to transport a storing member for pneumatic tube; a recognition machine provided separately from the money change machine and connected to the pneumatic tube, the recognition machine including a second recognition unit configured to recognize a paper sheet having been put into the recognition machine, and a storing mechanism configured to store the paper sheet having been recognized by the second recognition unit, into the storing member for pneumatic tube to be transported by the pneumatic tube; and a control unit to which information relating to the paper sheet stored in the change storing and feeding unit of the money change machine and information relating to a paper-sheet recognition result by the second recognition unit of the recognition machine are respectively transmitted, the control unit being configured to calculate a deposit amount of the paper sheet by adding up the former information and the latter information.

According to such a money handling system, the money or the like is managed by means of the money change machine and the recognition machine connected to the pneumatic tube, and the money change machine and the recognition machine are respectively connected, for communication, with the control unit. Thus, it is possible to reliably manage, as to the paper sheet stored in the money change machine (a banknote or the like as a change) and the paper sheet transported to an apparatus other than the money change machine by the pneumatic tube, a deposit amount of the paper sheet as a total amount (a deposit amount of the paper sheet in the overall money handling system).

Such an aforementioned money handling system further includes a notification unit provided to the control unit and configured to give a notice to an operator, an unacceptable kind of a paper sheet and/or an unacceptable denomination of a banknote have/has been previously set in the money change machine; when a paper sheet of this kind or denomination is recognized by the first recognition unit, the paper sheet is dispensed to the outside of the money change machine; and at this time, the control unit controls the notification unit so as to notify that the paper sheet having been dispensed to the outside of the money change machine is to be put into the recognition machine. Thus, it is possible to restrain a trouble in which an operator forgets to put the paper sheet having been dispensed to the outside of the money change machine into the recognition machine.

In such an aforementioned money handling system, until the deposit amount of the paper sheet is calculated by the control unit, the banknote stored in the change storing and feeding unit is not dispensed as a change to the outside of the money change machine. In this case, unless the deposit amount of the paper sheet is confirmed by the control unit, no change can be prepared by the money change machine.

The present invention is a money handling system including: a money change machine including a housing, an inlet for putting a paper sheet from the outside of the housing to the inside thereof, a transport unit disposed inside the housing and configured to transport the paper sheet having been put into the housing through the inlet, a first recognition unit disposed on the transport unit and configured to recognize the paper sheet having been put into the housing through the inlet, a change storing and feeding unit disposed inside the housing and configured to store, as a change, a banknote of a specific denomination among the paper sheet having been recognized by the first recognition unit, and to feed out the stored banknote to the transport unit, and an outlet connected to the transport unit, for dispensing a paper sheet from the inside of the housing to the outside thereof; a pneumatic tube configured to transport a storing member for pneumatic tube; a recognition machine provided separately from the money change machine and connected to the pneumatic tube, the recognition machine including a second recognition unit configured to recognize a paper sheet having been put into the recognition machine, and a storing mechanism configured to store the paper sheet having been recognized by the second recognition unit, into the storing member for pneumatic tube to be transported by the pneumatic tube; and a control unit to which information relating to the paper sheet having been dispensed from the money change machine and information relating to a paper-sheet recognition result by the second recognition unit of the recognition machine are respectively transmitted, the control unit being configured to judge whether or not the former information and the latter information conform to each other.

According to such a money handling system, the information relating to the paper sheet having been dispensed from the money change machine and the information relating to the paper-sheet recognition result by the recognition unit of the recognition machine are respectively transmitted to the control unit, and the control unit judges whether or not the former information and the latter information conform to each other. Thus, it can be judged whether or not the paper sheet having been dispensed from the money change machine has been properly stored into the storing member for pneumatic tube by the storing mechanism of the recognition machine.

In such an aforementioned money handling system, the control unit is configured to control the pneumatic tube; and when the information relating to the paper sheet having been dispensed from the money change machine and the information relating to the paper-sheet recognition result by the second recognition unit of the recognition machine do not conform to each other, the control unit controls the pneumatic tube such that the storing member for pneumatic tube is not transported. Thus, only when the paper sheet having been dispensed from the money change machine has been properly stored into the storing member for pneumatic tube, the storing member for pneumatic tube can be transported.

Such an aforementioned money handling system further includes a notification unit provided to the control unit and configured to give a notice to an operator, in the money change machine, a paper sheet other than a banknote to be used as a change in the money change machine, among the paper sheet having been put into the money change machine, is dispense to the outside of the money change machine, after the deposit amount of the banknote has been confirmed in the money change machine; and at this time, the control unit controls the notification unit so as to notify that the paper sheet having been dispensed to the outside of the money change machine is to be put into the recognition machine.

In the money handling system of the present invention, the control unit is disposed away from the money change machine and the recognition machine.

Alternatively, the control unit is disposed inside the housing of the money change machine.

In the money handling system of the present invention, the control unit is provided with a memory unit, and the control unit is configured to cause the memory unit to record a total amount of the banknote having been recognized by the second recognition unit of the recognition machine.

In the money handling system of the present invention, the storing member for pneumatic tube is provided with a memory unit, and the recognition machine is provided with an information writing unit configured to write, into the memory unit, the paper-sheet recognition information by the second recognition unit of the recognition machine. Thus, when the storing member for pneumatic tube is sent by the pneumatic tube to an apparatus other than the money change machine, the information of the paper sheet stored in the storing member for pneumatic tube can be confirmed by reading the information written in the memory unit of the storing member for pneumatic tube.

In the money handling system of the present invention, the storing member for pneumatic tube includes a plurality of divided storing spaces, and the storing mechanism of the recognition machine is configured to store paper sheets respectively into the storing spaces of the storing member for pneumatic tube. Thus, paper sheets can be stored by kind or denomination, for example, into the storing member for pneumatic tube.

In the money handling system of the present invention, the storing member for pneumatic tube storing money to be used as a change in the money change machine is transported by the pneumatic tube, from an apparatus other than the money change machine to a position near the recognition machine.

The present invention is a money handling system including: a money change machine including a housing, an inlet for putting a coin from the outside of the housing to the inside thereof, a transport unit disposed inside the housing and configured to transport the coin having been put into the housing through the inlet, a first recognition unit disposed on the transport unit and configured to recognize the coin having been put into the housing through the inlet, a change storing and feeding unit disposed inside the housing and configured to store, as a change, a coin of a specific denomination among the coin having been recognized by the first recognition unit, and an outlet for dispensing a coin from the inside of the housing to the outside thereof; a pneumatic tube configured to transport a storing member for pneumatic tube; a recognition machine provided separately from the money change machine and connected to the pneumatic tube, the recognition machine including a second recognition unit configured to recognize a coin having been put into the recognition machine, and a storing mechanism configured to store the coin having been recognized by the second recognition unit, into the storing member for pneumatic tube to be transported by the pneumatic tube; and a control unit to which information relating to the coin stored in the change storing and feeding unit of the money change machine and information relating to a coin recognition result by the second recognition unit of the recognition machine are respectively transmitted, the control unit being configured to calculate a deposit amount of the coin by adding up the former information and the latter information.

According to such a money handling system, the coin is managed by means of the money change machine and the recognition machine connected to the pneumatic tube, and the money change machine and the recognition machine are respectively connected, for communication, with the control unit. Thus, it is possible to reliably manage, as to the coin stored in the money change machine and the coin transported to an apparatus other than the money change machine by the pneumatic tube, a deposit amount of the coin as a total amount (a deposit amount of the coin in the overall money handling system).

The present invention is a money handling system including: a money change machine including a housing, an inlet for putting a coin from the outside of the housing to the inside thereof, a transport unit disposed inside the housing and configured to transport the coin having been put into the housing through the inlet, a first recognition unit disposed on the transport unit and configured to recognize the coin having been put into the housing through the inlet, a change storing and feeding unit disposed inside the housing and configured to store, as a change, a coin of a specific denomination among the coin having been recognized by the first recognition unit, and an outlet for dispensing a coin from the inside of the housing to the outside thereof; a pneumatic tube configured to transport a storing member for pneumatic tube; a recognition machine provided separately from the money change machine and connected to the pneumatic tube, the recognition machine including a second recognition unit configured to recognize a coin having been put into the recognition machine, and a storing mechanism configured to store the coin having been recognized by the second recognition unit, into the storing member for pneumatic tube to be transported by the pneumatic tube; and a control unit to which information relating to the coin having been dispensed from the money change machine and information relating to a coin recognition result by the second recognition unit of the recognition machine are respectively transmitted, the control unit being configured to judge whether or not the former information and the latter information conform to each other.

According to such a money handling system, the information relating to the coin having been dispensed from the money change machine and the information relating to the coin recognition result by the recognition unit of the recognition machine are respectively transmitted to the control unit, and the control unit judges whether or not the former information and the latter information conform to each other. Thus, it can be judged whether or not the coin having been dispensed from the money change machine has been properly stored into the storing member for pneumatic tube by the storing mechanism of the recognition machine.

The present invention is a money handling method including: putting a paper sheet including a banknote to be used as a change in a money change machine, into the money change machine; recognizing the paper sheet having been put into the money change machine, by a first recognition unit of the money change machine; recognizing a paper sheet other than the banknote to be used as a change in the money change machine, by a second recognition unit of a recognition machine provided separately from the money change machine; storing the paper sheet having been recognized by the second recognition unit of the recognition machine, into a storing member for pneumatic tube; transporting the storing member for pneumatic tube storing the paper sheet, to an apparatus other than the money change machine, by a pneumatic tube; and calculating a deposit amount of the paper sheet by adding up information relating to the paper sheet stored in the money change machine and information relating to a paper-sheet recognition result by the second recognition unit of the recognition machine.

The present invention is a money handling method including: putting a paper sheet into a money change machine; recognizing the paper sheet having been put into the money change machine by a first recognition unit of the money change machine, and storing a banknote to be used as a change in the money change machine, into the money change machine and dispensing a paper sheet other than the banknote to be used as a change in the money change machine to the outside of the money change machine, based on a recognition result by the first recognition unit; recognizing the paper sheet having been dispensed to the outside of the money change machine, by a second recognition unit of a recognition machine provided separately from the money change machine; storing the paper sheet having been recognized by the second recognition unit of the recognition machine, into a storing member for pneumatic tube; transporting the storing member for pneumatic tube storing the paper sheet, to an apparatus other than the money change machine, by a pneumatic tube; and comparing information relating to the paper sheet having been dispensed from the money change machine and information of the paper-sheet recognition result by the second recognition unit of the recognition machine with each other, and judging whether or not the former information and the latter information conform to each other.

The present invention is a money handling method including: putting a coin to be used as a change in a money change machine, into the money change machine; recognizing the coin having been put into the money change machine, by a first recognition unit of the money change machine; recognizing a coin other than the coin to be used as a change in the money change machine, by a second recognition unit of a recognition machine provided separately from the money change machine; storing the coin having been recognized by the second recognition unit of the recognition machine, into a storing member for pneumatic tube; transporting the storing member for pneumatic tube storing the coin, to an apparatus other than the money change machine, by a pneumatic tube; and calculating a deposit amount of the coin by adding up information relating to the coin stored in the money change machine and information relating to a coin recognition result by the second recognition unit of the recognition machine.

The present invention is a money handling method including: putting a coin into a money change machine; recognizing the coin having been put into the money change machine by a first recognition unit of the money change machine, and storing a coin to be used as a change in the money change machine, into the money change machine and dispensing a coin other than the coin to be used as a change in the money change machine to the outside of the money change machine, based on a recognition result by the first recognition unit; recognizing the coin having been dispensed to the outside of the money change machine, by a second recognition unit of a recognition machine provided separately from the money change machine; storing the coin having been recognized by the second recognition unit of the recognition machine, into a storing member for pneumatic tube; transporting the storing member for pneumatic tube storing the coin, to an apparatus other than the money change machine, by a pneumatic tube; and comparing information relating to the coin having been dispensed from the money change machine and information of the coin recognition result by the second recognition unit of the recognition machine with each other, and judging whether or not the former information and the latter information conform to each other.

In the present invention, there may be used a money change machine connected to a pneumatic tube, the money change machine including a housing, an inlet for putting a paper sheet from the outside of the housing to the inside thereof, a transport unit disposed inside the housing and configured to transport the paper sheet having been put into the housing through the inlet, a recognition unit disposed on the transport unit and configured to selectively recognize the paper sheet having been put into the housing through the inlet, a change storing and feeding unit disposed inside the housing and configured to store, as a change, a banknote of a specific denomination among the paper sheet having been recognized by the recognition unit, and to feed out the stored banknote to the transport unit, an outlet connected to the transport unit, for dispensing a paper sheet from the inside of the housing to the outside thereof, and a storing mechanism connected to the transport unit and configured to store a paper sheet having been sent thereto from the transport unit, into a storing member for pneumatic tube to be transported by the pneumatic tube.

According to such a money change machine, there is provided the storing mechanism configured to store a paper sheet having been sent thereto from the transport unit, into the storing member for pneumatic tube to be transported by the pneumatic tube. Thus, the paper sheet having been sent from the transport unit is automatically stored into the storing member for pneumatic tube by the storing mechanism, and the storing member for pneumatic tube storing the paper sheet is transported by the pneumatic tube from the money change machine to another apparatus. Therefore, an operator can transport the paper sheet, such as a banknote, a valuable document and so on, from the money change machine to the other apparatus by the pneumatic tube, without directly touching the paper sheet, whereby the security can be improved.

In such an aforementioned money change machine, the storing mechanism may be connected to the pneumatic tube, and the storing mechanism may be configured such that the storing member for pneumatic tube into which a paper sheet has been stored by the storing mechanism is transported directly by the pneumatic mechanism. Thus, an operator can transport the storing member for pneumatic tube storing the paper sheet by the pneumatic tube, without directly touching the storing member for pneumatic tube.

Alternatively, the storing mechanism may be connected to the transport unit in the housing, the storing mechanism may be spaced apart from the pneumatic tube, and the storing mechanism may be configured such that the storing member for pneumatic tube into which a paper sheet has been stored by the storing mechanism can be taken to the outside of the housing.

In such an aforementioned money change machine, a paper sheet to be stored into the storing member for pneumatic tube by the storing mechanism may be a paper sheet other than the banknote to be used as a change in the money change machine.

In such an aforementioned money change machine, the storing member for pneumatic tube into which a paper sheet is stored by the storing mechanism may be provided with a locking unit that locks a door for closing a storing space in the storing member for pneumatic tube, and a locking state of the door by the locking unit can be released only under a predetermined condition. Due to the provision of such a locking unit on the storing member for pneumatic tube, it can be prevented that a third party or the like intentionally takes out a paper sheet from the storing member for pneumatic tube, whereby security can be further improved.

Such an aforementioned money change machine may further include an escrow unit disposed inside the housing and connected to the transport unit, the escrow unit being configured to escrow a paper sheet having been put into the housing through the inlet and recognized by the recognition unit, and the storing mechanism is configured to store a paper sheet having been sent thereto from the escrow unit, into the storing member for pneumatic tube.

Alternatively, the storing mechanism may be configured to store a paper sheet having been sent thereto directly from the recognition unit, into the storing member for pneumatic tube.

In such an aforementioned money change machine, the storing member for pneumatic tube may be provided with a memory unit, and the storing mechanism may be provided with an information writing unit configured to write, into the memory unit, information of a paper sheet which has been stored into the storing member for pneumatic tube by the storing mechanism. Thus, when the storing member for pneumatic tube is sent to an apparatus other than the money change machine by the pneumatic tube, the information of the paper sheet stored in the storing member for pneumatic tube can be confirmed by reading the information written in the memory unit of the storing member for pneumatic tube.

In such an aforementioned money change machine, the storing member for pneumatic tube may include a plurality of divided storing spaces, and the storing mechanism is configured to store paper sheets respectively into the storing spaces of the storing member for pneumatic tube. Thus, the paper sheets can be stored by kind or denomination, for example, into the storing member for pneumatic tube.

Such an aforementioned money change machine may further include a control unit configured to control, at least, the transport unit, the change storing and feeding unit and the storing mechanism, and the control unit executes either of the modes, i.e., (a) a depositing mode in which a paper sheet having been put into the housing through the inlet is recognized by the recognition unit, and the paper sheet is transported to any one of the storing mechanism, the change storing and feeding unit and the outlet, based on a recognition information by the recognition unit and (b) a pneumatic-tube transport mode in which a paper sheet having been put into the housing through the inlet is transported directly to the storing mechanism, without being recognized by the recognition unit. Thus, in order that all the paper sheets are transported from the money change machine to an apparatus other than the money change machine by the pneumatic tube, a period of time required for the paper-sheet handling process in the money change machine can be reduced, by selecting the pneumatic-tube transport mode.

In such an aforementioned money change machine, the storing member for pneumatic tube storing money to be used as a change in the money change machine may be transported from an apparatus other than the money change machine to the money change machine by the pneumatic tube.

In the present invention, there may be used a money change machine connected to a pneumatic tube, the money change machine including a housing, an inlet for putting a coin from the outside of the housing to the inside thereof, a transport unit disposed inside the housing and configured to transport the coin having been put into the housing through the inlet, a recognition unit disposed on the transport unit and configured to selectively recognize the coin having been put into the housing through the inlet, a change storing and feeding unit disposed inside the housing and configured to store, as a change, a coin of a specific denomination among the coin having been recognized by the recognition unit, an outlet connected to the transport unit, for dispensing a coin stored in the change storing and feeding unit to the outside of the housing, and a storing mechanism connected to the transport unit and configured to store a coin having been sent thereto from the transport unit, into a storing member for pneumatic tube to be transported by the pneumatic tube.

According to such a money change machine, there is provided the storing mechanism configured to store a coin having been sent thereto from the transport unit, into the storing member for pneumatic tube to be transported by the pneumatic tube. Thus, the coin having been sent from the transport unit is automatically stored into the storing member for pneumatic tube by the storing mechanism, and the storing member for pneumatic tube storing the paper sheet is transported by the pneumatic tube from the money change machine to another apparatus. Therefore, an operator can transport the coin from the money change machine to the other apparatus by the pneumatic tube, without directly touching the coin, whereby the security can be improved.

In the present invention, there may be used a money handling system including the aforementioned money change machine, a pneumatic tube connected to the money change machine, and an apparatus other than the money change machine, the other apparatus being connected to the pneumatic tube, and a storing member for pneumatic tube is transported by the pneumatic tube from the money change machine to the other apparatus.

In the present invention, there may be used a money handling method including putting a paper sheet into a money change machine, selectively recognizing the paper sheet having been put into the money change machine, storing a banknote of a specified denomination among the recognized paper sheet, into a change storing and feeding unit, feeding out the banknote stored in the change storing and feeding unit from the change storing and feeding unit and dispensing the banknote as a change to the outside of the money change machine, sending at least a part of the paper sheet among the paper sheet having been put into the money change machine, to a storing mechanism, and storing the paper sheet having been sent to the storing mechanism, into a storing member for pneumatic tube to be transported by a pneumatic tube connected to the money change machine, by the storing mechanism.

According to such a money handling method, at least a part of the paper sheet among the paper sheet having been put into the money change machine is sent to the storing mechanism, and the paper sheet having been sent to the storing mechanism is stored by the storing mechanism into the storing member for pneumatic tube to be transported by the pneumatic tube connected to the money change machine. Thus, at least a part of the paper sheet among the paper sheet having been put into the money change machine is automatically stored by the storing mechanism into the storing member for pneumatic tube, and the storing member for pneumatic tube storing the paper sheet is transported from the money change machine to another apparatus. Therefore, an operator can transport the paper sheet, such as a banknote, a valuable document and so on, from the money change machine to the other apparatus by the pneumatic tube, without directly touching the paper sheet, whereby the security can be improved.

In the present invention, there may be used a money handling method including putting a coin into a money change machine, selectively recognizing the coin having been put into the money change machine, storing a coin of a specified denomination among the recognized coin, into a change storing and feeding unit, dispensing, as a change, the coin stored in the change storing and feeding unit to the outside of the money change machine, sending at least a part of the coin among the coin having been put into the money change machine, to a storing mechanism, and storing the coin having been sent to the storing mechanism, into a storing member for pneumatic tube to be transported by a pneumatic tube connected to the money change machine, by the storing mechanism.

According to such a money handling method, at least a part of the coin among the coin having been put into the money change machine is sent to the storing mechanism, and the coin having been sent to the storing mechanism is stored by the storing mechanism into the storing member for pneumatic tube to be transported by the pneumatic tube connected to the money change machine. Thus, at least a part of the coin among the coin having been put into the money change machine is automatically stored by the storing mechanism into the storing member for pneumatic tube, and the storing member for pneumatic tube storing the coin is transported from the money change machine to another apparatus. Therefore, an operator can transport the coin from the money change machine to the other apparatus by the pneumatic tube, without directly touching the coin, whereby the security can be improved.

Such an aforementioned money handling method may further include transporting the storing member for pneumatic tube by the pneumatic tube, from the money change machine to an apparatus other than the money change machine.

BRIEF DESCRIPTION OF THE DRAWINGS

FIGS. 4(a) to 4(c) are perspective views of a storing mechanism of the money change machine shown in FIG. 2, sequentially showing that a paper sheet is stored into the storing member by the storing mechanism.

FIGS. 5(a) to 5(d) are upper views of the storing mechanism shown in FIG. 4, sequentially showing that a paper sheet is stored into the storing member by the storing mechanism.

FIG. 6 is a control block view of the money handling system shown in FIG. 1.

FIG. 11 is a schematic perspective view showing a structure of the storing member according to a modification of the first embodiment.

FIG. 12 is a structural view showing a structure of the storing member and a structure of the storing mechanism according to the modification of the first embodiment.

FIG. 13 is a flowchart showing another operation of the money change machine shown in FIG. 1.

FIG. 17 is a structural view showing a structure of a money change machine of the money handling system shown in FIG. 16.

FIG. 18 is a structural view showing a structure of a storing mechanism of the money change machine shown in FIG. 17.

FIG. 19 is a structural view showing another structure of the storing mechanism of the money change machine shown in FIG. 17.

FIG. 23 is a structural view showing a structure of a storing member and a structure of the storing mechanism according to a modification of the second embodiment.

FIG. 24 is a structural view showing a structure of the money change machine according to the modification of the second embodiment.

FIG. 25 is a structural view showing a structure of the money change machine that dispenses a coin as a change, according to the modification of the second embodiment.

FIG. 26 is a structural view showing another structure of the money change machine that dispenses a coin as a change, according to the modification of the second embodiment.

DETAILED DESCRIPTION OF THE INVENTION

First Embodiment

A first embodiment of the present invention will be described herebelow, with reference to the drawings. FIGS. 1 to 10 are views showing a money handling system according to this embodiment.

Figure 1:
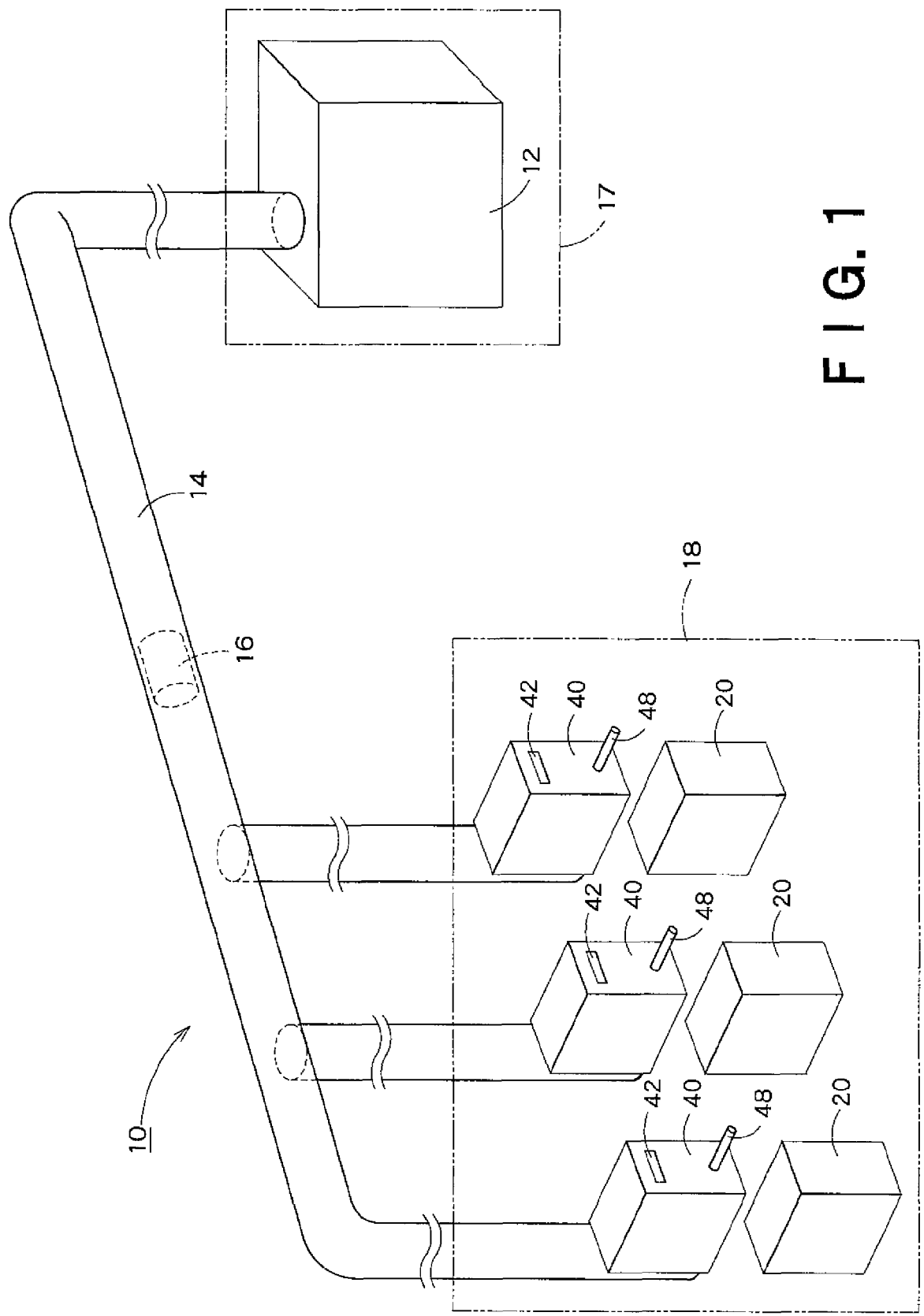
FIG. 1 is a schematic structural view schematically showing a structure of a money handling system according to a first embodiment of the present invention.

A structure of a money handling system 10 according to the first embodiment is described with reference to FIG. 1. As shown in FIG. 1, a cash room 17 includes a safe 12. A register line 18, which is located on a position separated from the cash room 17, includes a plurality of money change machines 20. In the register line 18, each of the money change machine 20 is provided with a corresponding recognition machine 40. As shown in FIG. 1, each of the recognition machine 40 is disposed separately from the corresponding money change machine 20. A pneumatic tube (pneumatic tube system) 14 is located between the respective recognition machines 40 and the safe 12. More specifically, the pneumatic tube 14 includes an air tube respectively connected to the respective recognition machines 40 and the safe 12. In the air tube, a cylindrical storing member (capsule) 16 storing a paper sheet, such as a banknote or a valuable document, or a coin, is transported by a pneumatic pressure between the respective recognition machines 40 and the safe 12.

To be more specific, in order that a banknote, a coin and so on are transported from the money change machine 20 provided in the register line 18, to the safe 12 provided in the cash room 17, so as to collect the banknote, the coin and so on transported to the safe 12, a banknote, a coin and so on to be collected are stored into the storing member 16 in the recognition machine 40 corresponding to each money change machine 20, the storing member 16 is transported by the pneumatic tube 14 from the recognition machine 40 to the safe 12, and the banknote, the coin and so on are taken out from the storing member 16 in the cash room 17, and the taken-out banknote, the coin and so on are collected. On the other hand, for example, in order that a banknote, a coin and so on placed in the safe 12 are refilled as a change into the money change machine 20, a banknote and a coin to be refilled are stored into the storing member 16 in the safe 12, the storing member 16 is transported by the pneumatic tube 14 from the safe 12 to a position near the recognition machine 40 corresponding to each money change machine 20, the banknote, the coin and so on are taken out from the storing member 16 in the register line 18, and the taken-out banknote, the coin and so on are stored as a change into each money change machine 20.

Figure 3:
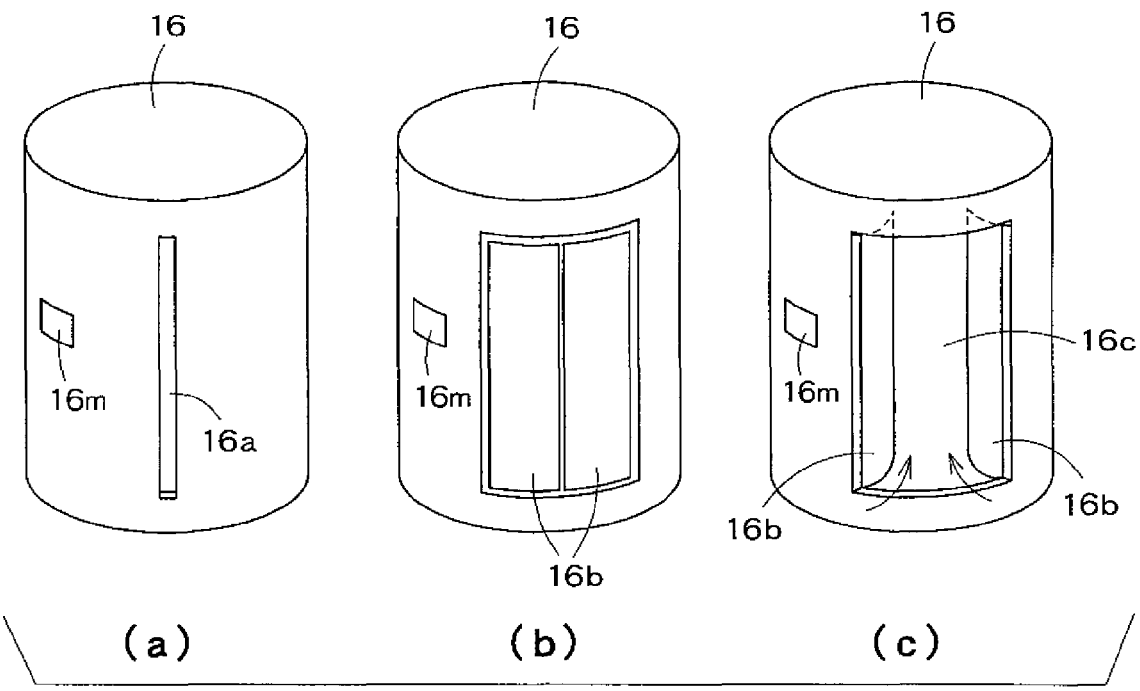
FIG. 3 is a schematic perspective view of a storing member that is transported by a pneumatic tube in the money handling system shown in FIG. 1.

A structure of the storing member 16 transported by the pneumatic tube 14 is described in detail with reference to FIG. 3. FIGS. 3(a) to 3(c) are perspective views showing various structural examples of the storing member 16. Although various types of members can be used as the storing member 16, the storing member 16 as shown in FIG. 3(a) can be used by way of example. The storing member 16 shown in FIG. 3(a) has a hollow cylindrical shape. A longitudinally extending elongate slit 16a is formed in a side surface of the storing member 16. A length of the slit 16a is larger than a length of a paper sheet to be stored into the storing member 16, so that a paper sheet can be put into the storing member 16 through the slit 16a.

Other structural examples of the storing member 16 are shown in FIGS. 3(b) and 3(c). Each of the storing member 16 shown in FIGS. 3(b) and 3(c) has, instead of the slit 16a in the side surface of the storing member 16, an opening 16c formed in the side surface of the storing member 16, and a pair of right and left doors 16b that can close the opening 16c. As shown in FIG. 3(c), the pair of right and left doors 16b can be respectively moved inward the storing member 16. When the respective doors 16b are moved inward the storing member 16, a paper sheet can be put into the storing member 16 through the opening 16c. Each of the doors 16b is provided with a spring which urges a force that constantly acts on each door 16b in a closing direction. Thus, when the doors 16b are opened, the respective doors 16b are moved inward the storing member 16 against the contract force of the springs disposed on the doors 16b.

As shown in FIGS. 3(a) to 3(c), a memory unit 16m formed of, e.g., an IC tag or the like, is provided on the storing member 16. The memory unit 16m is configured to record a serial number of the corresponding money change machine 20, information of a paper sheet stored in the storing member 16, specifically, a kind of the paper sheet (a banknote, a valuable document (e.g., a check or a coupon), an ID medium (e.g., a receipt) and so on), a denomination (when the paper sheet is a banknote), the number of stored paper sheets by kind, the number of stored banknotes by denomination, information relating to fitness, a serial number and so on.

Figure 2:
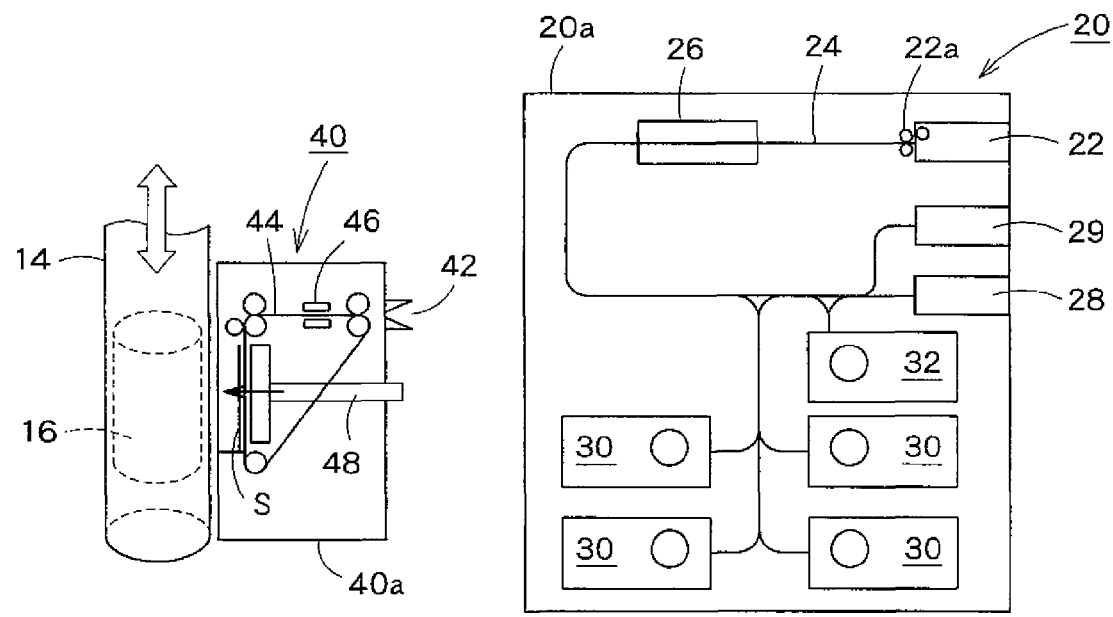
FIG. 2 is a structural view showing a structure of a money change machine and a structure of a recognition machine in the money handling system shown in FIG. 1.

Next, concrete structures of the money change machine 20 and the recognition machine 40 are described with reference to FIGS. 2, 4 and 5. In FIGS. 2, 4 and 5, there is described a case in which a banknote change machine is used as the money change machine 20, and a recognition machine configured to recognize a paper sheet including a banknote is used as the recognition machine 40. A case in which a coin change machine and a coin recognition machine are used as the money change machine 20 and the recognition machine 40 will be described later.

As shown in FIG. 2, the money change machine 20 includes a housing 20a of a substantially rectangular parallelepiped shape, an inlet 22 for putting a paper sheet, such as a banknote, a valuable document and so on, from the outside of the housing 20a to the inside thereof, a transport unit 24 disposed inside the housing 20a and configured to transport, one by one, a paper sheet having been put into the housing 20a through the inlet 22, and an outlet 28 connected to the transport unit 24, for dispensing a paper sheet from the inside of the housing 20a to the outside thereof. As shown in FIG. 2, a reject opening 29 is connected to the transport unit 24, so that a reject paper sheet (described below), which has been sent from the transport unit 24 to the reject opening 29, can be taken out by an operator from the outside of the housing 20a.

The inlet 22 is provided with a feeding mechanism 22a configured to feed, one by one, a paper sheet, which has been put into the inlet 22, to the inside of the housing 20a. In addition, the transport unit 24 is provided with a recognition unit 26. The recognition unit 26 is configured to recognize a paper sheet having been put into the housing 20a. In the inside of the housing 20a, there are disposed four change storing and feeding units 30. The respective change storing and feeding units 30 are connected to the transport unit 24, respectively. A banknote of a specific denomination among paper sheets, which have been recognized by the recognition unit 26, is stored as a change into each change storing and feeding unit 30 by denomination. Each change storing and feeding unit 30 can feed out a banknote stored in this storing and feeding unit 30 to the transport unit 24.

An escrow unit 32 is disposed inside the housing 20a. The escrow unit 32 is connected to the transport unit 24. A paper sheet, which has been put into the housing 20a through the inlet 22 and recognized by the recognition unit 26, is escrowed in the escrow unit 32. In addition, the escrow unit 32 can feed out a paper sheet escrowed in this escrow unit 32 to the transport unit 24.

Each of the change storing and feeding units 30 and the escrow unit 32 include a storing and feeding mechanism of a drum type. To be more specific, each of the change storing and feeding units 30 and the escrow unit 32 have a drum capable of being rotated in a forward direction and a rearward direction, and a pair of tapes are reeled up by the drum. Paper sheets, which have been sent from the transport unit 24 to each of the change storing and feeding units 30 or the escrow unit 32, are sandwiched between the pair of tapes and sequentially reeled up, one by one, so as to be stored. On the other hand, when a paper sheet is fed out, the drum is rotated in a direction opposite to the direction in which the paper sheet is stored, so that the pair of tapes reeled up on the drum are released from this drum, whereby the paper sheets sandwiched between the pair of tapes are fed out, one by one, to the transport unit 24.

The respective change storing and feeding units 30 and the escrow unit 32 are not limited to units having the above structure which is formed of a drum and a pair of tapes, in which a paper sheet sandwiched between the pair of tapes is reeled up together with the pair of tapes by the drum. The respective change storing and feeding units 30 and the escrow unit 32 may have another structure. For example, the respective change storing and feeding units 30 and the escrow unit 32 may be of a stacker type.

As shown in FIG. 2, the recognition machine 40 includes a housing 40a of a substantially rectangular parallelepiped shape, an inlet 42 for putting a paper sheet, such as a banknote, a valuable document and so on, from the outside of the housing 40a to the inside thereof, and a transport unit 44 disposed inside the housing 40a and configured to transport, one by one, a paper sheet which has been put into the housing 40a through the inlet 42. As shown in FIG. 2, an end of the pneumatic tube 14 is located near the outside surface of the housing 40a of the recognition machine 40. Alternatively, the end of the pneumatic tube 14 may be attached to the outside surface of the housing 40a of the recognition machine 40. In addition, as shown in FIG. 2, inside the housing 40a of the recognition machine 40, a storing mechanism 48 is located near a downstream side end of the transport unit 44. The storing mechanism 48 is configured to store a paper sheet shown by a reference character S in FIG. 2, which has been transported by the transport unit 44 and recognized by a recognition unit 46, into the storing member 16 which waits at the end of the pneumatic tube 14 near the recognition machine 40 so as to be transported by the pneumatic tube 14. Details of the structure of the storing mechanism 48 disposed in the recognition machine 40 are described herebelow with reference to FIGS. 4 and 5.

FIGS. 4(a) to 4(c) are perspective views showing the structure of the storing mechanism 48 disposed in the recognition machine 40, sequentially showing that a paper sheet S is stored into the storing member 16 by the storing mechanism 48. FIGS. 5(a) to 5(d) are upper views of the storing mechanism 48 shown in FIG. 4, sequentially showing that the paper sheet S is stored into the storing member 16 by the storing mechanism 48. In the example shown in FIGS. 4 and 5, a storing member having the slit 16a in a side surface thereof, as shown in FIG. 3(a), is used as the storing member 16. As shown in FIGS. 4 and 5, the storing mechanism 48 has a pushing member 48a configured to push one paper sheet S, which has been transported to the downstream side end of the transport unit 44, toward the storing member 16 waiting at the end of the pneumatic tube 14.

The operation by which the paper sheet S is stored into the storing member 16 by the storing mechanism 48 is described below. As shown in FIGS. 4(a) and 5(a), the paper sheet S, which has been transported by the transport unit 44 and recognized by the recognition unit 46 in the recognition machine 40, is escrowed in a standing state on a position near the downstream side end of the transport unit 44. Thereafter, the pushing member 48a is moved toward the one escrowed paper sheet S so as to push the paper sheet S toward the storing member 16. Specifically, as shown in FIGS. 4(b) and 5(b), when the paper sheet S is pushed by the pushing member 48a, the paper sheet S is longitudinally folded. The folded paper sheet S is pushed by the pushing member 48a into the slit 16a of the storing member 16 (see FIGS. 4(c) and 5(c)). When the pushing member 48a further pushes the folded paper sheet S into the storing member 16, the paper sheet S is completely stored into the storing member 16, as shown in FIG. 5(d). For each time when a paper sheet is sent to the position as shown by the reference character S in FIG. 2, the pushing member 48a stores the paper sheet into the storing member 16.

One structural example of the storing mechanism 48 is described with reference to FIGS. 4 and 5. However, as long as the storing mechanism 48 can store a paper sheet having been sent thereto from the transport unit 44, into the storing member 16 waiting at the end of the pneumatic tube 14 near the recognition machine 40, the storing mechanism 48 may have any structure other than the structure shown in FIGS. 4 and 5.

As shown in FIG. 6, the money change machine 20 and the recognition machine 40 are respectively connected, for communication, with a control apparatus 60. The control apparatus 60 is located away from the money change machine 20 and the recognition machine 40.

In addition, the money change machine 20 is provided with a control unit 34. The control unit 34 is located inside the housing 20a, and is connected to the feeding mechanism 22a, the transport unit 24, the recognition unit 26, the change storing and feeding units 30, the escrow unit 32 and so on, respectively. A signal relating to recognition information of a paper sheet by the recognition unit 26 is transmitted to the control unit 34, and the control unit 34 is configured to transmit instruction signals to the respective constituent elements such as the feeding mechanism 22a, the transport unit 24, the change storing and feeding units 30, the escrow unit 32 and so on, so as to control these constituent elements. Concrete control contents by the control unit 34 will be described later.

As shown in FIG. 6, an interface 36 is connected to the control unit 34, so that the control unit 34 can send and receive a signal to and from the control apparatus 60 through the interface 36. In addition, as shown in FIG. 6, the transport unit 44, the recognition unit 46, the storing mechanism 48 and so on of the recognition machine 40 are directly connected to the control apparatus 60, respectively. Thus, a signal relating to recognition information of a paper sheet by the recognition unit 46 is transmitted to the control apparatus 60, and the control apparatus 60 is configured to transmit instruction signals to the transport unit 44 and the storing mechanism 48 so as to control the transport unit 44 and the storing mechanism 48. Concrete control contents of the control apparatus 60 will be described later. The control apparatus 60 is connected, for communication, with a higher-level apparatus or the like, so that the control apparatus 60 can send and receive a signal to and from the higher-level apparatus. For example, the higher-level apparatus may be a POS register disposed in the register line 18, an amount-of-money data management software disposed in the cash room 17, a wireless terminal or the like. In particular, since the control apparatus 60 can send and receive a signal to and from the amount-of-money data management software disposed in the cash room 17, amount-of-money data information of a paper sheet stored in the storing member 16, which has been sent by the pneumatic tube 14 from the recognition machine 40 to the safe 12, can be transmitted from the register line 18 to the cash room 17. Thus, it is possible to compare amount-of-money data of a paper sheet actually taken out from the storing member 16 in the cash room 17, with amount-of-money data of a paper sheet in the information having been transmitted from the control apparatus 60.

As shown in FIG. 6, the control apparatus 60 includes a notification unit 62. The notification unit 62 can give various notices to an operator, by a sound or a display, or by both a sound and a display. In addition, the control apparatus 60 includes a memory unit 64. The control apparatus 60 causes the memory unit 64 to record a total amount of a paper sheet(s) having been recognized by the recognition unit 46 of the recognition machine 40.

As shown in FIG. 6, the storing mechanism 48 of the recognition machine 40 includes an information writing unit 48w configured to write information into the memory unit 16m of the storing member 16. The information writing unit 48w is configured to write, into the memory unit 16m of the storing member 16, a serial number of the money change machine 20, information of a paper sheet stored in the storing member 16, specifically, a kind of the paper sheet (a banknote, a valuable document (e.g., a check or a coupon), an ID medium (e.g., a receipt) and so on), a denomination (when the paper sheet is a banknote), the number of stored paper sheets by kind, the number of stored banknotes by denomination, information relating to fitness, a serial number and so on.

The pneumatic tube 14 may also be connected to the control apparatus 60 so that the pneumatic tube 14 can be controlled by the control apparatus 60. In this case, after operations of the money change machine 20 and the recognition machine 40 have been completed, the control apparatus 60 controls the pneumatic tube 14 so as to transport the storing member 16 from the recognition machine 40 to the safe 12.

Next, an operation of the money handling system 10 as structured above is described with reference to the flowcharts shown in FIGS. 9 and 10.

Firstly, an operator manually selects a banknote to be stored as a change into the money change machine 20, out of paper sheets to be handled. To be more specific, a denomination of a banknote to be stored as a change into the money change machine 20 is previously set in the money change machine 20. The operator selects a banknote of the set denomination from the paper sheets to be handled. As described below, the remaining banknote is stored into the storing member 16, and is transported by the pneumatic tube 14 to the cash room 17. Then, as shown in STEP 1 of FIG. 9, the banknote, which has been selected as a banknote to be stored as a change into the money change machine 20, is deposited into the money change machine 20.

A banknote deposit process into the money change machine 20 is described in more detail with reference to the flowchart shown in FIG. 10.

When the deposit process is performed in the money change machine 20, the operator firstly puts the banknote, which has been selected as a banknote to be stored as a change into the money change machine 20, into the inlet 22 of the money change machine 20. At this time, there is a possibility that the operator might wrongly select a banknote, so that a paper sheet, which is other than the banknote to be stored as a change into the money change machine 20, might be put into the inlet 22. In addition, the number of banknotes by denomination to be stored as a change into the money change machine 20 and a total amount thereof are set by the control unit 34.

After the paper sheet has been put into the inlet 22, the operator gives an instruction for starting the process through an operation unit to the control unit 34. Then, the paper sheet having been put into the inlet 22 is fed out, one by one, by the feeding mechanism 22a into the housing 20a, and the paper sheet is transported, one by one, by the transport unit 24 (STEP 11 of FIG. 10). Then, the paper sheet, which has been fed into the housing 20a and transported by the transport unit 24, is recognized by the recognition unit 26, as to its kind (a banknote, a valuable document (e.g., a check or a coupon), an ID medium (e.g., a receipt) and so on), a denomination (when the paper sheet is a banknote), authenticity, fitness, a serial number or the like (STEP 12 of FIG. 10). A paper sheet, which could not be recognized by the recognition unit 26, a paper sheet which has been recognized not as a banknote, a valuable document, an ID medium or the like, or a banknote which has been recognized as a counterfeit note ("YES" in STEP 13 of FIG. 10) is transported as a reject paper sheet to the reject opening 29 (STEP 14 of FIG. 10) so as to be taken out from the reject opening 29 by the operator.

Figure 10:
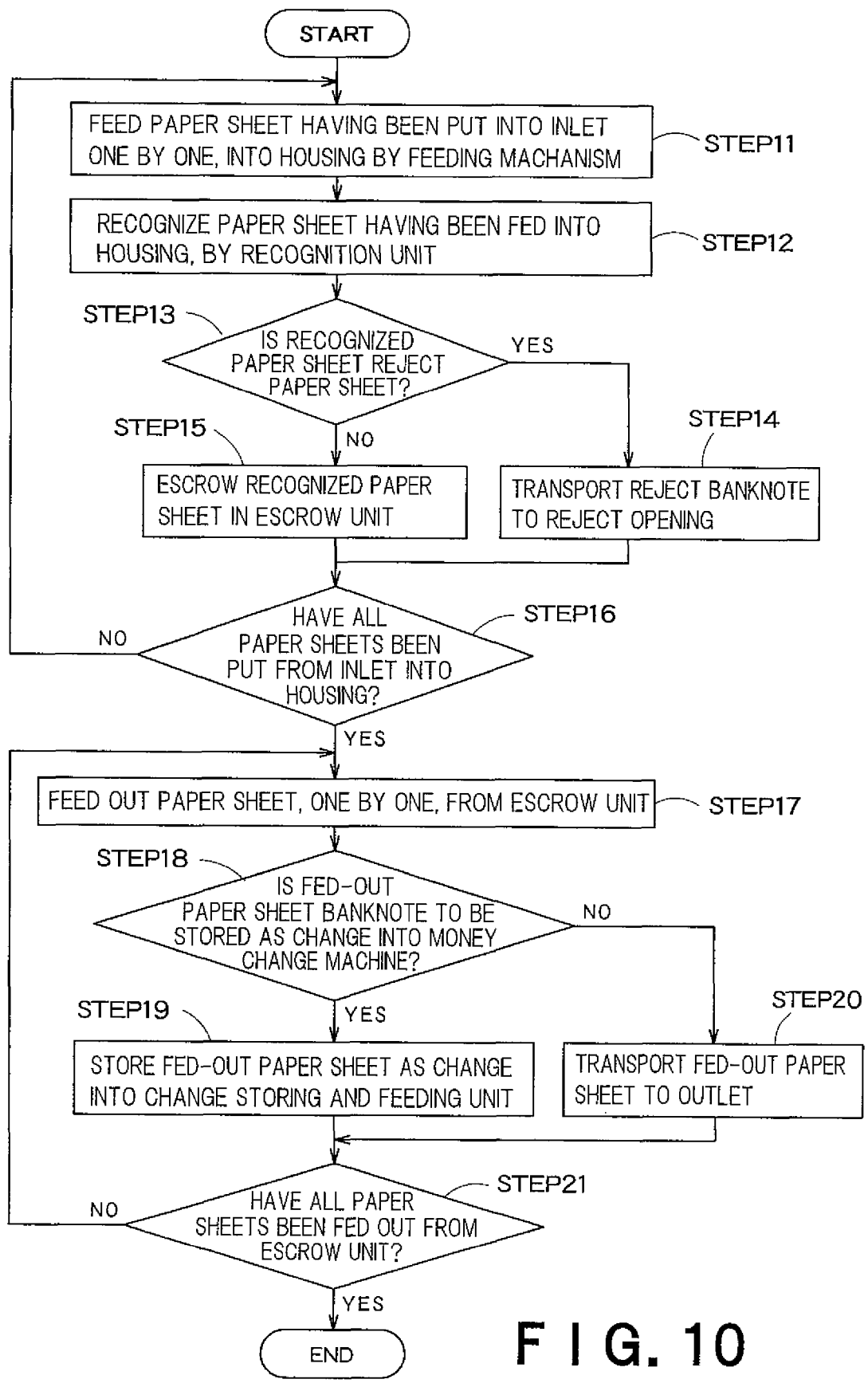
FIG. 10 is a flowchart showing in more detail the operation of the money change machine in the flowchart shown in FIG. 9.

On the other hand, when the paper sheet recognized by the recognition unit 26 is not a reject paper sheet ("NO" in STEP 13 of FIG. 10), the paper sheet is transported to the escrow unit 32, and is escrowed in the escrow unit 32 (STEP 15 of FIG. 10). Then, all the paper sheets have been put into the housing 20a through the inlet 22 and have been escrowed in the escrow unit 32 ("YES" in STEP 16 of FIG. 10), the paper sheets are fed out, one by one, from the escrow unit 32 to the transport unit 24 (STEP 17 of FIG. 10).

When the paper sheet fed out from the escrow unit 32 is a banknote of a predetermined denomination which has been set by the control unit 34 as a change, and a change corresponding to the denomination of the fed-out paper sheet (banknote) is not yet sufficiently stored in the change storing and feeding unit 30, the paper sheet fed out from the escrow unit 32 is stored by denomination as a change into the change storing and feeding unit 30 ("YES" in STEP 18 and STEP 19 of FIG. 10). More specifically, in a case where the control unit 34 sets the process such that one hundred 1,000-yen bills are stored as a change into the money change machine 20, when a paper sheet fed out from the escrow unit 32 is a 1,000-yen bill and the number of 1,000-yen bills stored as a change into the money change machine 20 in this deposit process is smaller than one hundred, the 1,000-yen bill fed out from the escrow unit 32 is stored into the change storing and feeding unit 30 corresponding to a 1,000-yen bill.

On the other hand, even when a paper sheet fed out from the escrow unit 32 is a banknote of a predetermined denomination which has been set by the control unit 34 as a change, but a change corresponding to the denomination of the fed-out paper sheet (banknote) has been already sufficiently stored in the change storing and feeding unit 30, the paper sheet fed out from the escrow unit 32 is transported as an overflow banknote to the outlet 28 ("NO" in STEP 18 and STEP 20 of FIG. 10). More specifically, for example, in a case where the control unit 34 sets the process such that one hundred 1,000-yen bills are stored as a change into the money change machine 20, when a paper sheet fed out from the escrow unit 32 is a 1,000-yen bill and the number of 1,000-yen bills stored into the money change machine 20 as a change in this deposit process has already reached one hundred, the 1,000-yen bill fed out from the escrow unit 32 is transported as an overflow banknote to the outlet 28.

In addition, even when a change corresponding to the denomination of the paper sheet (banknote) having been fed out from the escrow unit 32 is not yet sufficiently stored in the change storing and feeding unit 30, but the change storing and feeding unit 30 corresponding to the denomination of the banknote is full or nearly full, the paper sheet having been fed out from the escrow unit 32 is transported, not to the change storing and feeding unit 30, but to the outlet 28. Further, when the control unit 34 sets a total amount of banknotes to be stored as a change into the money change machine 20, among the paper sheets having been put thereinto, a banknote exceeding the total amount of banknotes to be stored as a change into the money change machine 20, among the banknotes having been fed out from the escrow unit 32, is transported, not to the change storing and feeding unit 30, but to the outlet 28.

Moreover, when a paper sheet fed out from the escrow unit 32 is not a banknote of a predetermined denomination which has been set by the control unit 34 as a change, the paper sheet is transported to the outlet 28 ("NO" in STEP 18 and STEP 20 of FIG. 10). Specifically, in a case where the control unit 34 sets the process such that a 1,000-yen bill is stored as a change into the money change machine 20, a banknote whose denomination is other than 1,000-yen, a valuable document, an ID medium and so on are transported to the outlet 28.

When even only one paper sheet is transported to the outlet 28, the notification unit 62 notifies the operator that the paper sheet having been transported to the outlet 28 should be put into the recognition machine 40. Namely, a paper sheet having been transported to the outlet 28 is a paper sheet of a kind which has been set as an unacceptable paper sheet as a change in the money change machine 20. Such a paper sheet is stored into the storing member 16, and is transported by the pneumatic tube 14 to the cash room 17. However, it sometimes occurs that the operator forgets to take out the paper sheet having been transported to the outlet 28 of the money change machine 20. Thus, the fact that the paper sheet has been transported to the outlet 28 is preferably notified by the notification unit 62 to the operator.

The above operation shown in the STEP 17 to STEP 20 of FIG. 10 is repeated until all the paper sheets are fed out from the escrow unit 32 ("NO" in STEP 21 of FIG. 10). After all the banknotes have been fed out from the escrow unit 32 and transported to the change storing and feeding units 30 or the outlet 28 ("YES" in STEP 21 of FIG. 10), a series of deposit processes in the money change machine 20 are ended. Thereafter, the control unit 34 of the money change machine 20 transmits, to the control apparatus 60, information relating to the number of banknotes by denomination, which are stored as a change in the change storing and feeding unit 30 and a total amount thereof.

The control unit 34 can perform a paper sheet process in an acceptance permission mode in which all the paper sheets having been put into the inlet 22 of the money change machine 20, including a paper sheet other than a banknote as a change, are stored into the housing 20a. Namely, for example, when the pneumatic tube 14 has a trouble so that a paper sheet is not stored into the storing member 16, all the paper sheets to be handled are stored into the money change machine 20.

In addition, in the above deposit process, a paper sheet other than a banknote as a change may be stored into the money change machine 20. For example, a mixture storing and feeding unit (not shown) may be disposed in the housing 20a of the money change machine 20, so that a paper sheet other than a banknote as a change, among paper sheets having been put into the inlet 22, is stored into the mixture storing and feeding unit, instead of being transported to the outlet 28. In this case, the control unit 34 of the money change machine 20 transmits, to the control apparatus 60, information relating to all the paper sheets stored in the money change machine 20, including information of the paper sheet stored in the mixture storing and feeding unit. In this case, the control unit 34 may include a memory unit (not shown), so that the information relating to all the paper sheets stored in the money change machine 20 can be recorded in the memory unit of the control unit 34.

Figure 9:
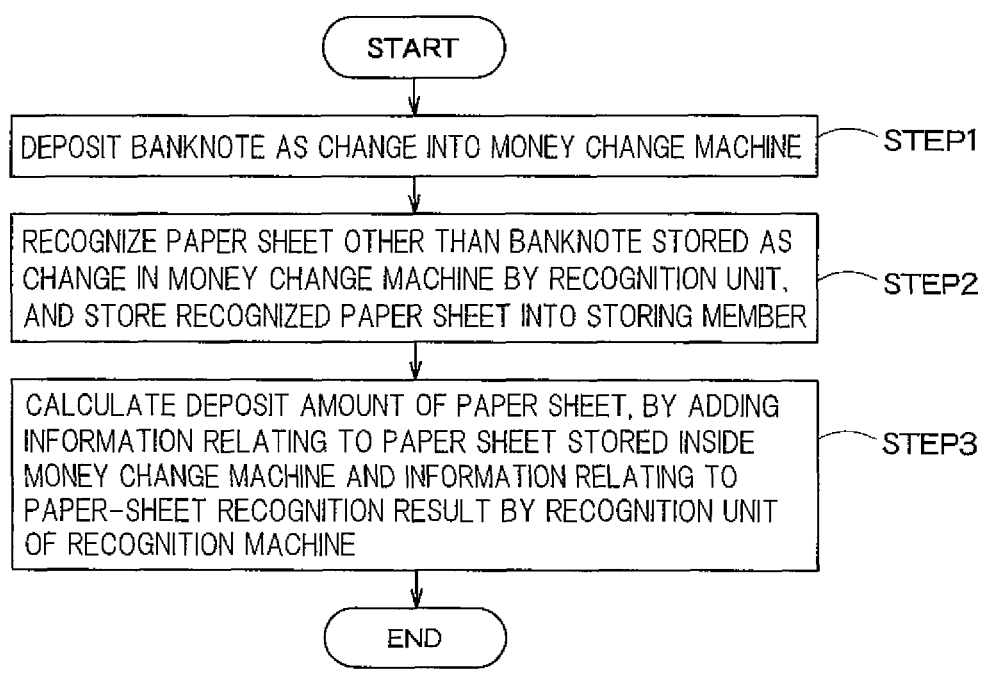
FIG. 9 is a flowchart showing an operation of the money handling system shown in FIG. 1.

Then, as shown in STEP 2 of FIG. 9, the operator puts a banknote, which is other than the banknote having been stored as a change into the money change machine 20, into the recognition machine 40, one by one. The paper sheet having been put thereinto is recognized by the recognition unit 46 of the recognition machine 40, and the recognized paper sheet is stored into the storing member 16.

To be more specific, the operator puts a paper sheet, which is other than the banknote having been stored as a change into the money change machine 20, one by one, into the housing 40a of the recognition machine 40 through the inlet 42 of the recognition machine 40. At this time, a paper sheet, which has been once put into the money change machine 20 and transported to the outlet 28 of the money change machine 20, is put, one by one, into the housing 40a of the recognition machine 40 through the inlet 42 of the recognition machine 40. The paper sheet having been put into the housing 40a is transported, one by one, by the transport unit 44, and is recognized by the recognition unit 46, as to its kind (a banknote, a valuable document (e.g., a check or a coupon), an ID medium (e.g., a receipt) and so on), a denomination (when the paper sheet is a banknote), authenticity, fitness, and so on. The recognition information of the paper sheet having been recognized by the recognition unit is transmitted to the control apparatus 60. The control apparatus 60 is configured to cause the memory unit 64 to record a total amount of the paper sheet(s) having been recognized by the recognition unit 46 of the recognition machine 40.

The paper sheet, having been recognized by the recognition unit 46, is stored, one by one, into the storing member 16 waiting at the end of the pneumatic tube 14 near the recognition machine 40, by the storing mechanism 48. After all the paper sheets have been stored into the storing member 16, the operation in the recognition machine 40 is ended.

Thereafter, as shown in STEP 3 of FIG. 9, the control apparatus 60 adds up the information relating to the paper sheet stored in the inside of the money change machine 20, which has been transmitted from the control unit 34 of the money change machine 20, and the information relating to the paper-sheet recognition result by the recognition unit 46 of the recognition machine 40. Thus, the control apparatus 60 calculates a deposit amount of the paper sheets (a deposit amount of the paper sheets in the overall money handling system 10). Regarding a paper sheet which cannot be recognized by the money change machine 20 and the recognition machine 40, detailed data of the paper sheet may be manually inputted into the control apparatus 60, and the pear sheet may be put into the storing member 16.

Next, an operation of the pneumatic tube 14 is described. After a paper sheet has been stored into the storing member 16 waiting at the end of the pneumatic tube 14 near the recognition machine 40, the pneumatic tube 14 transports the storing member 16 storing the paper sheet by a pneumatic pressure from the recognition machine 40 to the safe 12. Thereafter, in the cash room 17, the paper sheet is taken out from the storing member 16 having been transported to the safe 12, and the taken-out paper sheet is stored into the safe 12. When the cash room 17 includes the amount-of-money data management software connected, for communication, with the control apparatus 60, amount-of-money data of the banknote stored in the storing member 16, which has been transmitted from the control apparatus 60, and amount-of-money data of the paper sheet actually taken out from the storing member 16 in the cash room 17 are compared to each other, by means of the amount-of-money data management software.

As described above, according to the money handling system 10 in the first embodiment, there is disposed the recognition machine 40 connected to the pneumatic tube 14, separately from the money change machine 20. The recognition machine 40 includes the recognition unit 46 configured to recognize a paper sheet having been put into the recognition machine 40, and the storing mechanism 48 configured to store the paper sheet, which has been recognized by the recognition unit 46, into the storing member 16 to be transported by the pneumatic tube 14. In addition, the information relating to the paper sheet stored into the money change machine 20, and the information relating to the paper-sheet recognition result by the recognition unit 46 of the recognition machine 40, are respectively transmitted to the control apparatus 60. The control apparatus 60 is configured to calculate a deposit amount of the paper sheet(s) by adding up the former information and the latter information. In this manner, money or the like is managed with the use of the money change machine 20 and the recognition machine 40 connected to the pneumatic tube 14, and the money change machine 20 and the recognition machine 40 are respectively connected, for communication, with the control apparatus 60. Thus, it is possible to reliably manage, as to a paper sheet stored into the money change machine 20 (a banknote or the like as a change) and a paper sheet transported by the pneumatic tube 14 to an apparatus (e.g., the safe 12 or the like) other than the money change machine 20, a deposit amount of the paper sheet(s) as a total amount (a deposit amount of the paper sheet(s) in the overall money handling system 10).

The money handling system 10 in the first embodiment further includes the notification unit 62 disposed in the control apparatus 60, for giving a notice to an operator. An unacceptable kind of a paper sheet and/or an unacceptable denomination of a banknote have/has been previously set in the money change machine 20. When a paper sheet of this kind or denomination is recognized by the recognition unit 26, the paper sheet is dispensed to the outside of the money change machine 20. At this time, the control apparatus 60 is configured to control the notification unit 62 so as to notify that the paper sheet having been dispensed to the outside of the money change machine 20 should be put into the recognition machine 40. Due to the provision of the notification unit 62, it is possible to restrain a trouble in which an operator forgets to put the paper sheet having been dispensed to the outside of the money change machine 20 into the recognition machine 40.

Until the control apparatus 60 calculates a deposit amount of the paper sheets (see STEP 3 of FIG. 9), a banknote stored in the change storing and feeding unit 30 of the money change machine 20 may not be dispensed as a change to the outside of the money change machine 20. Namely, in this case, before a deposit amount of a paper sheet is confirmed by the control apparatus 60, the money change machine 20 cannot prepare a change.

In addition, in the money handling system 10 in the first embodiment, the control apparatus 60 is located away from the money change machine 20 and the recognition machine 40. Further, the control apparatus 60 is provided with the memory unit 64, and the control apparatus 60 causes the memory unit 64 to record a total amount of a banknote(s) having been recognized by the recognition unit 46 of the recognition machine 40.

In addition, in the money handling system 10 in the first embodiment, the storing member 16 is provided with the memory unit 16m, and the storing mechanism 48 of the recognition machine 40 is provided with the information writing unit 48w configured to write, into the memory unit 16m, information of a paper sheet which has been stored into the storing member 16 by the storing mechanism 48. More specifically, the information writing unit 48w is configured to write a serial number of the corresponding money change machine 20, information of a paper sheet stored in the storing member 16, specifically, a kind of the paper sheet (a banknote, a valuable document (e.g., a check or a coupon), an ID medium (e.g., a receipt) and so on), a denomination (when the paper sheet is a banknote), the number of stored paper sheets by kind, the number of stored banknotes by denomination, information relating to fitness, a serial number and so on. Thus, when the storing member 16 is sent to the cash room 17 by the pneumatic tube 14, the information of the paper sheet stored in the storing member 16 can be confirmed in the cash room 17, by reading the information written in the memory unit 16m. In addition, by comparing the information written in the memory unit 16m and the information transmitted from the control apparatus 60 with each other, amount-of-money data of a paper sheet stored in the storing member 16 can be checked.

In addition, in the money handling system 10 in the first embodiment, the storing member 16 storing a banknote to be used as a change in the money change machine 20 may be transported by the pneumatic tube 14 from an apparatus other than the money change machine 20, specifically, the safe 12, for example, to a position near the recognition machine 40. In this case, a banknote can be taken out from the storing member 16 having been transported from the safe 12 to the position near the recognition machine 40, and the taken-out banknote can be stored as a change into the money change machine 20.

In addition, the money handling method in the first embodiment includes depositing a paper sheet including a banknote to be used as a change in the money change machine 20 into the money change machine 20 and recognizing the paper sheet having been deposited into the money change machine 20 by the recognition unit 26 of the money change machine 20, recognizing a paper sheet other than the banknote to be used as a change in the money change machine 20 by the recognition unit 46 of the recognition machine 40 and storing the recognized paper sheet into the storing member 16, transporting the storing member 16 storing the paper sheet by the pneumatic tube 14 to an apparatus other than the money change machine 20, and calculating a deposit amount of the paper sheets by adding up information relating to the paper sheet stored into the money change machine 20 and information relating to the paper-sheet recognition result by the recognition unit 46 of the recognition machine 40.

The money handling system 10 and the money handling method according to the first embodiment are not limited to the above embodiment, and can be variously modified.

For example, when a deposit process is performed in the money change machine 20, instead of once escrowing a paper sheet having been recognized by the recognition unit 26 and transporting the paper sheet fed out from the escrow unit 32 to the change storing and feeding unit 30 or the outlet 28, it is possible to transport a paper sheet having been recognized by the recognition unit 26 directly to the change storing and feeding unit 30 or the outlet 28, without transporting the paper sheet to the escrow unit 32.

In addition, the storing member 16 as shown in FIGS. 3(a) to 3(c) may be provided with a door that closes the slit 16a or the opening 16c, and with a locking unit that locks the door into a closed state, when the door closes the slit 16a or the opening 16c. This example is described with reference to FIG. 11. In the storing member 16 shown in FIG. 11, the opening 16c and the doors 16b have the same structures as those shown in FIG. 3(c). The storing member 16 shown in FIG. 11 has a locking unit 16d that locks each of the doors 16b into a closed state, when the doors 16b close the opening 16c. The locking state of the doors 16b by the locking unit 16d can be released only under a predetermined condition. Specifically, the locking state of the doors 16b by the locking unit 16d can be released only by unlocking units (not shown) disposed on the safe 12 and the money change machine 20, respectively. Due to the provision of the locking unit 16b in the storing member 16, it can be prevented that a third party or the like intentionally takes out a paper sheet from the storing member 16, whereby security can be improved.

Alternatively, as shown in FIG. 12, there may used the storing member 16 including a plurality of divided storing spaces 16e, 16f and 16g. In this case, as shown in FIG. 12, the storing mechanism 48 is configured to be capable of storing paper sheets S respectively into the storing spaces 16e, 16f and 16g of the storing member 16. Thus, the paper sheets S can be stored by kind or denomination, for example, into the storing member 16.

Figure 7:
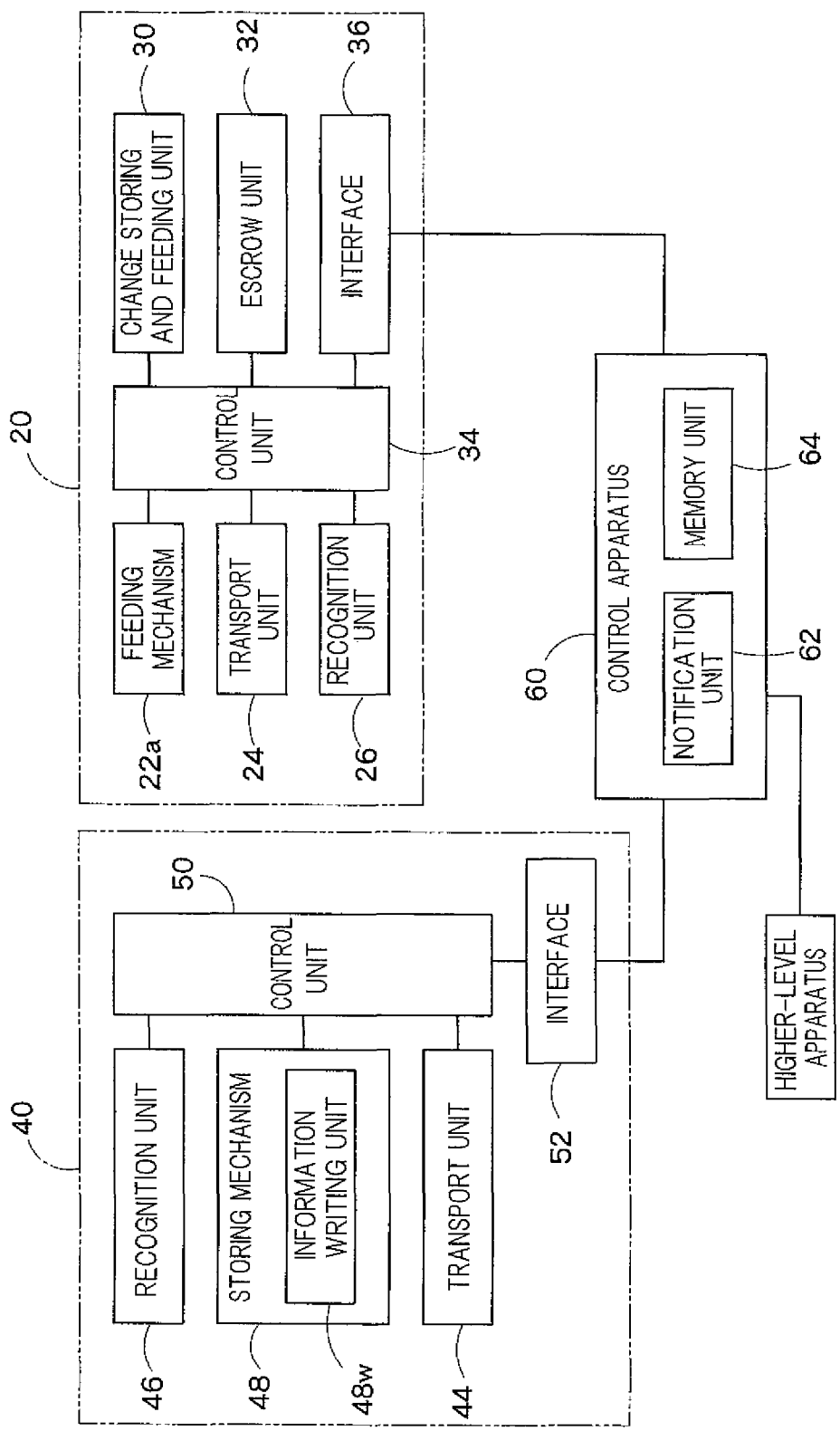
FIG. 7 is another control block view of the money handling system shown in FIG. 1.

The control block view of the money handling system 10 is not limited to that shown in FIG. 6. For example, the control apparatus 60 shown in FIG. 6 may be disposed in the money change machine 20. In addition, as shown in FIG. 7, the recognition machine 40 may include the control unit 50 and the interface 52 connected to the control unit 50, and the transport unit 44, the recognition unit 46 and the storing mechanism 48 of the recognition machine 40 may be respectively connected to the control unit 50. In this case, the control unit 50 sends and receives a signal to and from the control apparatus 60 through the interface 52.

Figure 8:
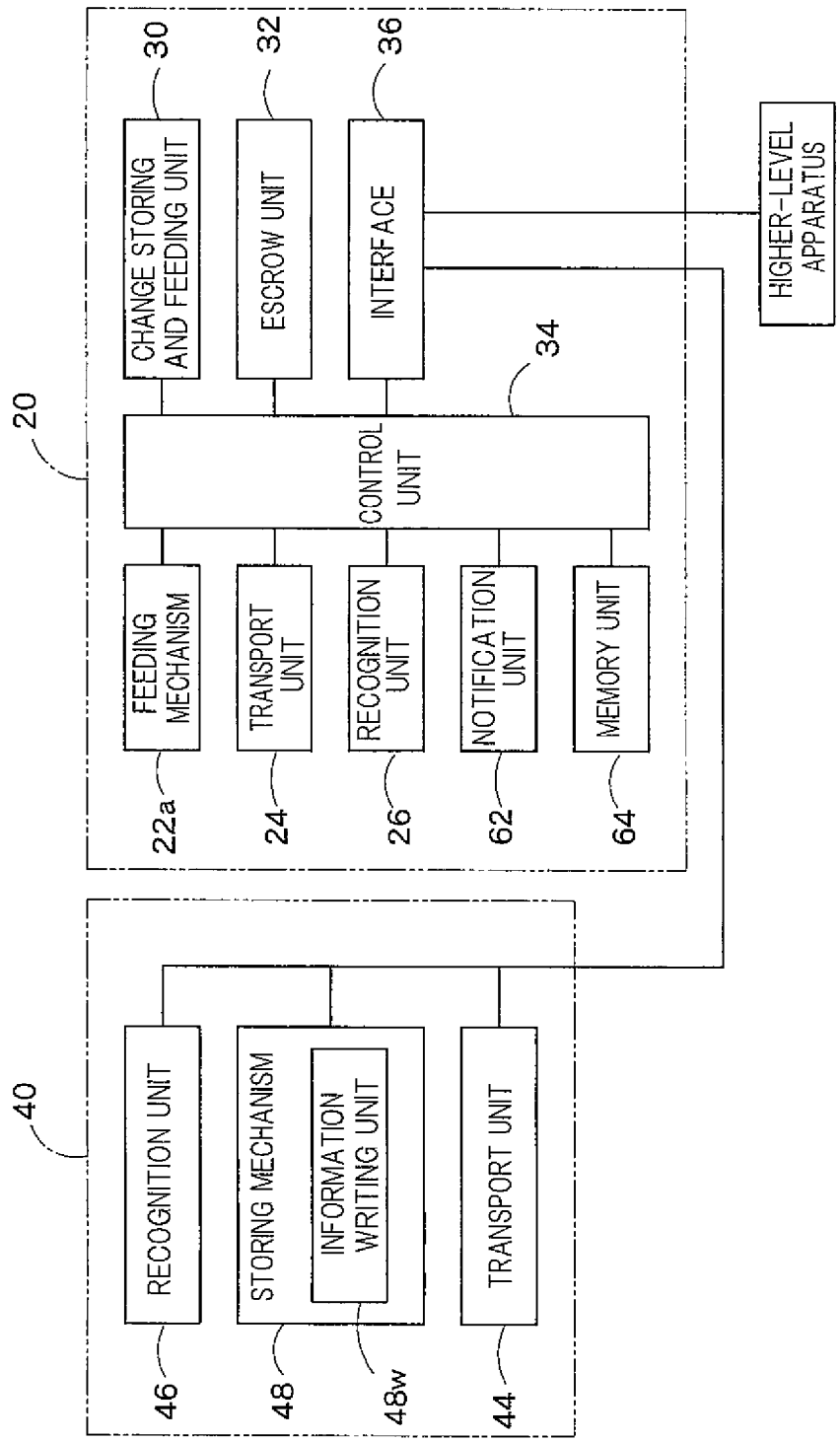
FIG. 8 is still another control block view of the money handling system shown in FIG. 1.

In addition, as shown in FIG. 8, the control apparatus 60 may not be provided separately from the money change machine 20 and the recognition machine 40, and the control unit 34 of the money change machine 20 may serve as the control apparatus 60. In this case, the transport unit 44, the recognition unit 46 and the storing mechanism 48 of the recognition machine 40 are respectively connected to the interface 36 of the control unit 34. Paper-sheet recognition information by the recognition unit 46 is transmitted to the control unit 34 through the interface 36, and the control unit 34 is configured to control the transport unit 44 and the storing mechanism 48 of the recognition machine 40 through the interface 36. In addition, the higher-level apparatus or the like outside the money change machine 20 is connected to the interface 36, so that the control unit 34 can send and receive a signal to and from the higher-level apparatus or the like through the interface 36. Further, the control unit 34 is provided with the notification unit 62 and the memory unit 64. In the control block view shown in FIG. 8, these notification unit 62 and the memory unit 64 are disposed inside the housing 20a of the money change machine 20. The notification unit 62 can give various notices to an operator by a sound or a display, or by both a sound and a display. The control unit 34 causes the memory unit 64 to record various information including a total amount of a paper sheet(s) having been recognized by the recognition unit 46 of the recognition machine 40.

In addition, the operation of the money handling system 10 is not limited to the operations shown in the flowcharts of FIGS. 9 and 10. Instead thereof, the money handling system 10 may perform an operation as shown in FIG. 13. The operation shown in the flowchart of FIG. 13 is described, which is performed by the money handling system 10 having the structure shown in the control block view of FIG. 6, for example.

As shown in STEP 31 of FIG. 13, an operator puts all the paper sheets to be handled to the inlet 22 of the money change machine 20. Then, in the money change machine 20, the paper sheets having been put into the inlet 22 are subjected to the process shown in the flowchart of FIG. 10. Thus, a banknote to be stored as a change into the money change machine 20 is stored into the change storing and feeding unit(s) 30, and other paper sheets are transported to the outlet 28 of the money change machine 20. At this time, in the money change machine 20, a paper sheet other than the banknote to be used as a change in the money change machine 20, among the paper sheets having been put into the money change machine 20, may be temporarily stored into the mixture storing and feeding unit (not shown) disposed in the housing 20a. Then, after a deposit amount of a banknote has been confirmed in the money change machine 20, the paper sheet temporarily stored in the mixture storing and feeding unit is fed out, one by one, from the mixture storing and feeding unit so as to be dispensed to the outside of the money change machine 20. After all the paper sheets have been transported to the outlet 28 of the money change machine 20, the control apparatus 60 controls the notification unit 62 such that the notification unit 62 gives a notice that the paper sheets having been dispensed to the outside of the money change machine 20 should be put into the recognition machine 40.

After the deposit process of a banknote as a change in the money change machine 20 has been ended, information of the paper sheet having been transported to the outlet 28 of the money change machine 20, specifically, information about a kind of document, a denomination, the number of paper sheets by kind and the number of banknotes by denomination, is transmitted from the control unit 34 to the control apparatus 60.

Then, as shown in STEP 32 of FIG. 13, the operator takes out the paper sheet from the outlet 28 of the money change machine 20, and puts the taken-out paper sheet, one by one, into the recognition machine 40. The paper sheet put thereinto is recognized by the recognition unit 46 of the recognition machine 40, and the recognized paper sheet is stored into the storing member 16.

To be more specific, the operator puts the paper sheet taken out from the outlet 28 of the money change machine 20, one by one, into the housing 40a of the recognition machine 40 through the inlet 42 of the recognition machine 40. The paper sheet having been put into the housing 40a is transported, one by one, by the transport unit 44, and is recognized by the recognition unit 46, as to its kind (a banknote, a valuable document (e.g., a check or a coupon), an ID medium (e.g., a receipt) and so on), a denomination (when the paper sheet is a banknote), authenticity, fitness and so on. The recognition information of the paper sheet having been recognized by the recognition unit 46 is transmitted to the control apparatus 60. The control apparatus 60 causes the memory unit 64 to record a total amount of the paper sheet(s) having been recognized by the recognition unit 46 of the recognition machine 40.

The paper sheet having been recognized by the recognition unit 46 is stored, one by one, by the storing mechanism 48, into the storing member 16 waiting at the end of the pneumatic tube 14 near the recognition machine 40. When all the paper sheets are stored into the storing member 16, the operation in the recognition machine 40 is ended.

Thereafter, as shown in STEP 33 of FIG. 13, the control apparatus 60 judges whether or not the information relating to the paper sheet having been dispensed from the money change machine 20 and the information relating to the paper-sheet recognition result by the recognition unit 46 of the recognition machine 40 conform to each other. Herein, when the former information and the latter information conform to each other (see "YES" in STEP 34 of FIG. 13), it is judged that all the paper sheets having been dispensed from the money change machine 20 have been properly stored into the storing member 16 by the storing mechanism 48 of the recognition machine 40. Then, the storing member 16 storing the paper sheets is transported by the pneumatic tube 14 from the recognition machine 40 to the safe 12 (STEP 35 of FIG. 13).

According to the money handling system 10 that performs the above operation shown in the flowchart of FIG. 13, the information relating to the paper sheet having been dispensed from the money change machine 20 and the information relating to the paper-sheet recognition result by the recognition unit 46 of the recognition machine 40, are respectively transmitted to the control apparatus 60, and the control apparatus 60 judges whether or not the former information and the latter information conform to each other. Thus, it can be judged whether or not the paper sheet having been dispensed from the money change machine 20 has been properly stored into the storing member 16 by the storing mechanism 48 of the recognition machine 40.

In addition, in the money handling system 10 that performs the operation shown in the flowchart of FIG. 13, when the information relating to the paper sheet having been dispensed from the money change machine 20 and the information relating to the paper-sheet recognition result by the recognition unit 46 of the recognition machine 40 do not conform to each other, the control apparatus 60 controls the pneumatic tube 14 such that the storing member 16 is not transported (see "NO" in STEP 34 of FIG. 13). Thus, only when the paper sheet having been dispensed from the money change machine 20 has been properly stored into the storing member 16, the storing member 16 can be transported.

In addition, in the money handling system 10 that performs the operation shown in the flowchart of FIG. 13, as described above, a paper sheet, which is other than a banknote to be used as a change in the money change machine 20, among the paper sheets having been put into the money change machine 20, may be dispensed to the outside of the money change machine 20, after a deposit amount of a banknote has been confirmed in the money change machine 20. At this time, the control apparatus 60 controls the notification unit 62 so as to notify that the paper sheet having been dispensed to the outside of the money change machine 20 should be put into the recognition machine 40.

In addition, the money handling system of the present invention is not limited to a system that handles a paper sheet including a banknote, a valuable document and so on. As the money handling system of the preset invention, there may be used a system that handles, not a banknote, but a coin. Herebelow, a money handling system including a money handling apparatus that dispenses, not a banknote, but a coin, as a change is described with reference to FIGS. 14 and 15.

Figure 14:
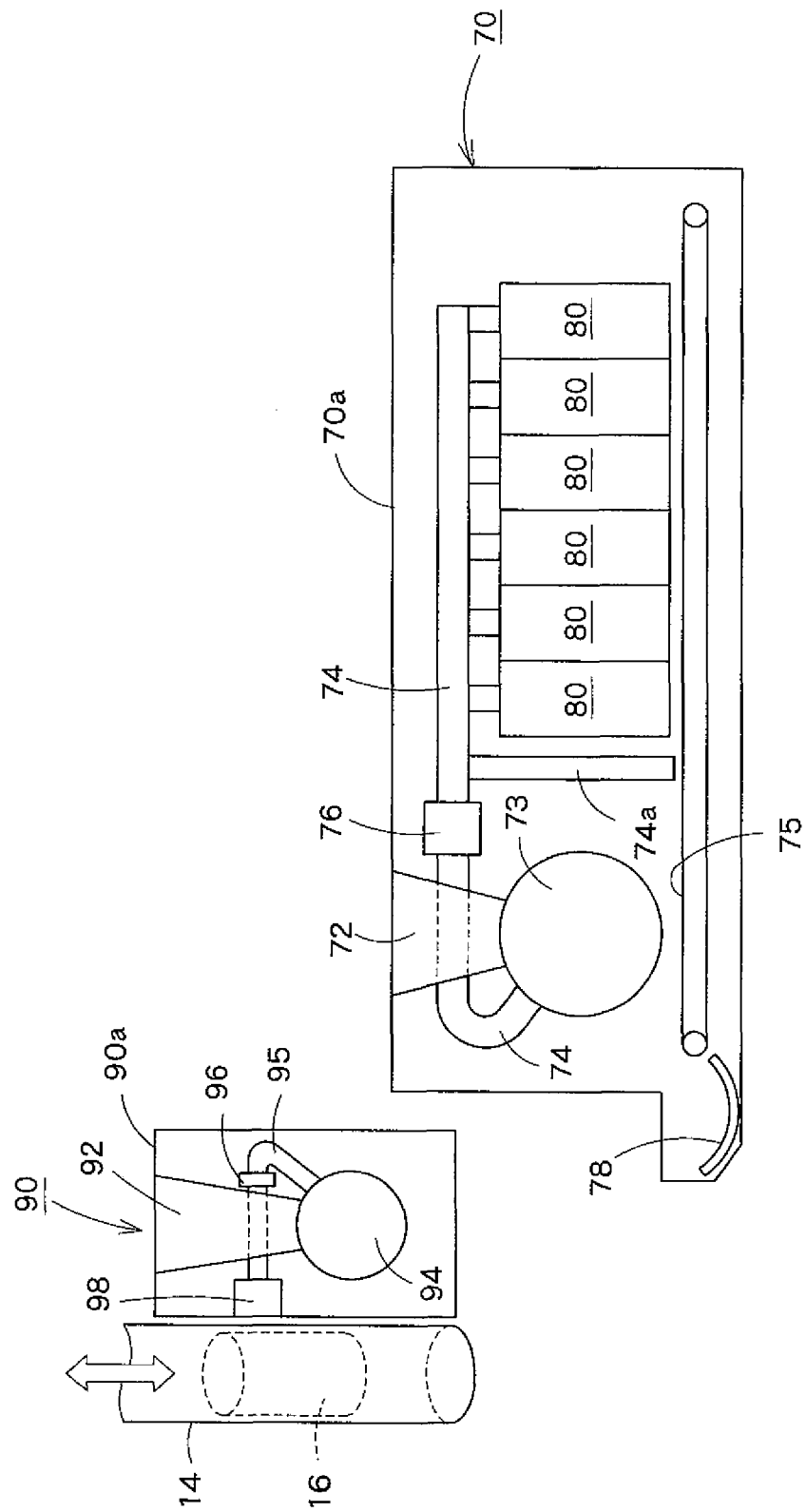
FIG. 14 is a structural view of the money handling system according to the modification of the first embodiment, having money change machine that dispenses a coin as a change.
Figure 15:
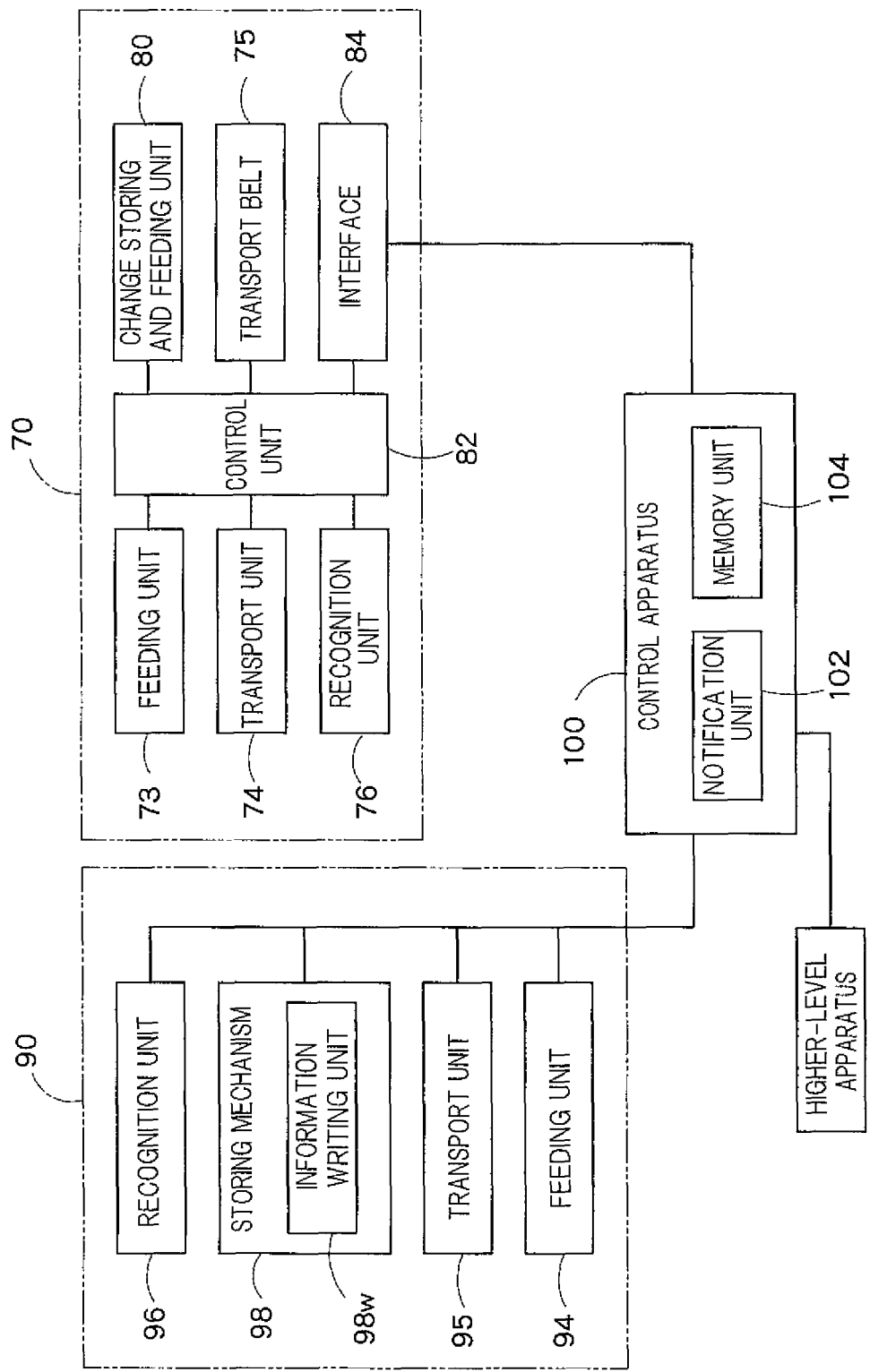
FIG. 15 is a control block view of the money handling system shown in FIG. 14.

As shown in FIGS. 14 and 15, the money handling system according to a modification includes a money change machine 70 configured to dispense money as a change, a recognition machine 90 provided separately from the money change machine 70, and a control apparatus 100 connected to the money change machine 70 and the recognition machine 90, respectively.

As shown in FIG. 14, the money change machine 70 includes a housing 70a of a substantially rectangular parallelepiped shape, an inlet 72 for putting a coin from the outside of the housing 70a to the inside thereof, a feeding unit 73 disposed inside of the housing 70a and configured to store a coin having been put from the inlet 72 and to feed out the stored coin one by one, and a transport unit 74 disposed inside housing 70a and configured to transport the coin fed out by the feeding unit 73, one by one.

The transport unit 74 is provided with a recognition unit 76. The recognition unit 76 is configured to recognize a coin fed out from the feeding unit 73. In addition, inside the housing 70a, there are disposed, e.g., six change storing and feeding units 80. Coins are sent by denomination from the transport unit 74 to the respective change storing and feeding units 80. A transport belt 75 is disposed below the respective change feeding and storing units 80. When a change dispense process is performed, a coin stored in each of the change storing and feeding units 80 is sent to the transport belt 75. An outlet 78 is disposed on an end of the transport belt 75, so that a coin having been sent from each of the change storing and feeding units 80 to the transport belt 75 is transported by the transport belt 75 to the outlet 78. An operator can take out the coin having been sent to the outlet 78, from outside the housing 70a.

A reject coin chute 74a is disposed on a downstream side of the recognition unit 76 in the transport unit 74. A coin, which could not be recognized by the recognition unit 76, or a coin, which has been recognized by the recognition unit 76 and judged to be rejected, is sent from the transport unit 74 to the reject coin chute 74a, and is sent directly to the transport belt 75 by the reject coin chute 74a. Namely, the reject coin is sent to the outlet 78, without being stored into the respective change storing and feeding units 80.

Next, a structure of the recognition machine 90 is described with reference to FIG. 14. As shown in FIG. 14, the recognition machine 90 includes a housing 90a of a substantially rectangular parallelepiped shape, an inlet 92 for putting a coin from the outside of the housing 90a to the inside thereof, a feeding unit 94 disposed inside the housing 90a and configured to store a coin having been put thereinto from the inlet 92 and to feed out the stored coin, one by one, and a transport unit 95 disposed inside the housing 90a and configured to transport the coin fed out by the feeding unit 94, one by one. As shown in FIG. 14, an end of a pneumatic tube 14 is located near the outside surface of the housing 90a of the recognition machine 90. Alternatively, the end of the pneumatic tube 14 may be attached to the outside surface of the housing 90a of the recognition machine 90.

The transport unit 95 is provided with a recognition unit 96. The recognition unit 96 is configured to recognize a coin fed out from the feeding unit 94. Inside the housing 90a of the recognition machine 90, there is disposed a storing mechanism 98 near a downstream side end of the transport unit 95. The storing mechanism 98 is configured to store a coin, which has been transported by the transport unit 95 and recognized by the recognition unit 96, into a storing member 16 waiting at the end of the pneumatic tube 14 near the recognition machine 90 so as to be transported by the pneumatic tube 14.

As shown in FIG. 15, the money change machine 70 and the recognition machine 90 are respectively connected, for communication, with the control apparatus 100. The control apparatus 100 is located away from the money change machine 70 and the recognition machine 90.

The money change machine 70 includes a control unit 82. The control unit 82 is disposed inside the housing 70a, and is connected to the feeding unit 73, the transport unit 74, the recognition unit 76, the change storing and feeding units 80, the transport belt 75 and so on, respectively. A signal relating to coin recognition information by the recognition unit 76 is transmitted to the control unit 82, and the control unit 82 transmits instruction signals to the respective constituent elements, such as the feeding unit 73, the transport unit 74, the change storing and feeding units 80, the transport belt 75 and so on, so as to control these constituent elements.

As shown in FIG. 15, an interface 84 is connected to the control unit 82. The control unit 82 can send and receive a signal to and from the control apparatus 100 through the interface 84. As shown in FIG. 15, the feeding unit 94, the transport unit 95, the recognition unit 96, the storing mechanism 98 and so on of the recognition machine 90 are directly connected to the control apparatus 100. A signal relating to coin recognition information by the recognition unit 96 is transmitted to the control apparatus 100, and the control apparatus 100 transmits instruction signals to the feeding unit 94, the transport unit 95 and the storing mechanism 98, so as to respectively control the feeding unit 94, the transport unit 95 and the storing mechanism 98. In addition, the control apparatus 100 is connected, for communication, with a higher-level apparatus or the like, so that the control apparatus 100 can send and receive a signal to and from the higher-level apparatus or the like.

In addition, as shown in FIG. 15, the control unit 100 includes a notification unit 102. The notification unit 102 can give various notices to an operator, by a sound or a display, or by both a sound and a display. The control apparatus 100 also includes a memory unit 104. The control apparatus 100 is configured to cause the memory unit 104 to record a total amount of a coin(s) having been recognized by the recognition unit 96 of the recognition machine 90.

In addition, as shown in FIG. 15, the storing mechanism 98 of the recognition machine 90 includes an information writing unit 98w configured to write information into a memory unit 16m of the storing member 16. The information writing unit 98w is configured to write, into the memory unit 16m of the storing member 16, a serial number of the money change machine 70, information about a coin stored in the storing member 16, specifically, a denomination of the coin and the number of coins by denomination.

The control block view of the money handling system as shown in FIG. 14 is not limited to that shown in FIG. 15. For example, the control apparatus 100 shown in FIG. 15 may be disposed in the money change machine 70. In addition, similarly to the control block view shown in FIG. 7, the recognition machine 90 may include a control unit and an interface, so that the control unit of the recognition machine 90 can send and receive a signal to and from the control apparatus 100 through the interface. In addition, similarly to the control block view shown in FIG. 8, the control apparatus 100 may not be provided separately from the money change machine 70 and the recognition machine 90, and the control unit 82 of the money change machine 70 may serve as the control apparatus 100.

Next, an operation of the money handling system shown in FIGS. 14 and 15 is described. In the below operation of the money handling system, there is performed an operation similar to the operation shown in the flowchart of FIG. 9.

Firstly, an operator manually selects a coin to be stored as a change into the money change machine 70, out of coins to be handled. To be more specific, a denomination of a coin to be stored as a change into the money change machine 70 is previously set in the money change machine 70. The operator selects a coin of the set denomination from the coins to be handled. As described below, a remaining coin is stored into the storing member 16, and is transported to the cash room 17 by the pneumatic tube 14. The coin, which has been selected as a coin to be stored as a change into the money change machine 70, is deposited into the money change machine 70.

A deposit process of a coin into the money change machined 70 is described in more detail below.

When the deposit process is performed in the money change machine 70, the operator collectively puts coins, which have been selected as a coin to be stored as a change into the money change machine 70, into the inlet 72 of the money change machine 70. At this time, there is a possibility that the operator might wrongly select a coin, so that a coin, which is other than the coin to be stored as a change into the money change machine 70, might be put into the inlet 72. In addition, the number of coins by denomination to be stored as a change into the money change machine 70 and a total amount thereof are set by the control unit 82.

After the coins have been collectively put into the inlet 72, the operator gives an instruction for starting the process through an operation unit to the control unit 82. Then, the coins having been put into the inlet 72 and stored in the feeding unit 73 is fed out, one by one, to the transport unit 74. The coins are transported, one by one, by the transport unit 74, and are recognized by the recognition unit 76, as to its denomination, authenticity, fitness and so on. A coin, which could not be recognized by the recognition unit 76, or a coin which has been recognized by the recognition unit 76 and judged as a coin that is not to be stored as a change into the change storing and feeding unit 80, is sent to the reject coin chute 74a. Such a coin falls downward in the reject coin chute 74a so as to be sent to the transport belt 75. When a coin recognized by the recognition unit 76 is a coin to be stored into the change storing and feeding unit 80, the coin is sent by denomination to the respective change storing and feeding units 80 so as to be stored into these change storing and feeding units 80.

Thereafter, the coin having been sent from the reject coin chute 74a to the transport belt 75 is transported by the transport belt 75 to the outlet 78.

When even only one coin is transported to the outlet 78, the notification unit 102 notifies the operator that the coin having been transported to the outlet 78 should be put into the recognition machine 90. Namely, the coin having been transported to the outlet 78 is a coin of a denomination which has been set as an unacceptable coin as a change in the money change machine 70. Such a coin is stored into the storing member 16, and is transported by the pneumatic tube 14 to the cash room 17. However, it sometimes occurs that the operator forgets to take out the coin having been transported to the outlet 78 of the money change machine 70. Thus, the fact that the coin has been transported to the outlet 78 is preferably notified by the notification unit 102 to the operator.

Then, after all the coins have been fed out from the feeding unit 73 and transported to the change storing and feeding units 80 or the outlet 78, a series of the deposit processes in the money change machine 70 are ended.

Thereafter, the control unit 82 of the money change machine 70 transmits information relating to the number of coins by denomination stored as a change in the change storing and feeding units 80 and a total amount thereof, to the control apparatus 100.

Then, the operator collectively put coins, which are other than the coin(s) having been stored as a change into the money change machine 70, into the recognition machine 90. The coins put thereinto are recognized by the recognition unit 96 of the recognition machine 90, and the recognized coins are stored into the storing member 16. The operator may put the coins, which are other than the coin having been stored as a change into the money change machine 70, one by one, into the recognition machine 90.

To be more specific, the operator puts coins, which are other than the coin having been stored as a change into the money change machine 70, collectively or one by one, into the housing 90a of the recognition machine 90. At this time, a coin, which has been once put into the money change machine 70 and transported to the outlet 78 of the money change machine 70, is put into the housing 90a of the recognition machine 90 through the inlet 92 of the recognition machine 90. After the coin has been put into the inlet 92, the operator gives an instruction for starting a process through an operation unit to the control apparatus 100. Then, the coin having been put into the inlet 92 and stored in the feeding unit 94 is fed out, one by one, to the transport unit 95. The coin is transported, one by one, by the transport unit 95, and is recognized by the recognition unit 96, as to its denomination, authenticity, fitness and so on. Recognition information of the coin having been recognized by the recognition unit 96 is transmitted to the control apparatus 100. The control apparatus 100 is configured to cause the memory unit 104 to record a total amount of the coin(s) having been recognized by the recognition unit 96 of the recognition machine 90.

The coin having been recognized by the recognition unit 96 is stored, one by one, by the storing mechanism 98, into the storing member 16 waiting at the end of the pneumatic tube 14 near the recognition machine 90. After all the coins have been stored into the storing member 16, the operation in the recognition machine 90 is ended.

Thereafter, the control apparatus 100 adds up the information relating to the coin stored as a change into the change storing and feeding unit 80 of the money change machine 70, which has been transmitted from the control unit 82 of the money change machine 70, and the information relating to the coin recognition result by the recognition unit 96 of the recognition machine 90. Thus, the control apparatus 100 calculates a deposit amount of the coin(s) (a deposit amount of the coin(s) in the overall money handling system).

As described above, according to the money handling system as shown in FIGS. 14 and 15, there is disposed the recognition machine 90 connected to the pneumatic tube 14, separately from the money change machine 70. The recognition machine 90 includes the recognition unit 96 configured to recognize a coin having been put into the recognition machine 90, and the storing mechanism 98 configured to store the coin, which has been recognized by the recognition unit 96, into the storing member 16 to be transported by the pneumatic tube 14. In addition, the information relating to the coin stored into the change storing and feeding unit 80 of the money change machine 70, and the information relating to the coin recognition result by the recognition unit 96 of the recognition machine 90, are respectively transmitted to the control apparatus 100. The control apparatus 100 calculates a deposit amount of the coins by adding up the former information and the latter information. In this manner, coins are managed with the use of the money change machine 70 and the recognition machine 90 connected to the pneumatic tube 14, and the money change machine 70 and the recognition machine 90 are respectively connected, for communication, with the control apparatus 100. Thus, it is possible to reliably manage, as to a coin stored into the money change machine 70 and a coin transported to an apparatus (e.g., the safe 12 or the like) other than the money change machine 70, a deposit amount of the coin(s) as a total amount.

The operation of the money handling system as shown in FIGS. 14 and 15 is not limited to the above operation. Instead thereof, the operation of the money handling system as shown in FIGS. 14 and 15 may be as follows. In the below operation of the money handling system, an operation similar to the operation shown in the flowchart of FIG. 13 is performed.

Firstly, an operator puts all the coins to be handled into the inlet 72 of the money change machine 70. Then, in the money change machine 70, the coins having been put into the inlet 72 are subjected to a process similar to the above process.

Thus, a coin to be stored as a change into the money change machine 70 is stored into the change storing and feeding unit 80, and a coin other than the above coin is transported to the outlet 78 of the money change machine 70. At this time, in the money change machine 70, a coin other than the coin to be used as a change in the money change machine 70, among the coins having been put into the money change machine 70, may be escrowed, e.g., on the transport belt 75. After a deposit amount of a coin(s) has been confirmed in the money change machine 70, the coin escrowed on the transport belt 75 may be transported by the transport belt 75 to the outlet 78 so as to be dispensed to the outside of the money change machine 70. When a coin is transported to the outlet 78 of the money change machine 70, the control apparatus 100 controls the notification unit 102 so as to notify that the coin having been dispensed to the outside of the coin change machine 70 should be put into the recognition machine 90.

When the deposit process of the coin as a change is ended in the coin change machine 70, information about the coin having been transported to the outlet 78 of the money change machine 70, specifically information about a denomination, the number of coins by denomination and so on is transmitted from the control unit 82 to the control apparatus 100.

Then, the operator takes out the coin from the outlet 78 of the coin change machine 70, and puts the taken-out coin into the recognition machine 90. The coin having been put thereinto is recognized by the recognition unit 96 of the recognition machine 90, and the recognized coin is stored into the storing member 16.

To be more specific, the operator puts the coin, which has been taken out from the outlet 78 of the money change machine 70, into the housing 90a of the recognition machine 90 through the inlet 92 of the coin recognition machine 90. The coin, which has been put into the housing 90a and fed out from the feeding unit 94, is transported, one by one, by the transport unit 95, and is recognized by the recognition unit 96, as to its denomination, authenticity, fitness and so on. The recognition result of the coin recognized by the recognition unit 96 is transmitted to the control apparatus 100. The control apparatus 100 causes the memory unit 104 to record a total amount of the coin(s) having been recognized by the recognition unit 96.

The coin having been recognized by the recognition unit 96 is stored, one by one, by the storing mechanism 98, into the storing member 16 waiting at the end of the pneumatic tube 14 near the recognition machine 90. When all the coins are stored into the storing member 16, the operation in the recognition machine 90 is ended.

Thereafter, the control apparatus 100 judges whether or not the information relating to the coin having been dispensed from the money change machine 70 and the coin recognition result by the recognition unit 96 of the recognition machine 90 conform to each other. When the former information and the latter information conform to each other, it is judged that all the coins having been dispensed from the money change machine 70 have been properly stored into the storing member 16 by the storing mechanism 98 of the recognition machine 90. Then, the storing member 16 storing the coin is transported by the pneumatic tube 14 from the recognition machine 90 to the safe 12.

According to the above money handling system, the information relating to the coin having been dispensed from the money change machine 70 and the coin recognition result by the recognition unit 96 of the recognition machine 90 are respectively transmitted to the control apparatus 100, and the control apparatus 100 judges whether or not the former information and the latter information conform to each other. Thus, it can be judged whether or not the coin dispensed from the money change machine 70 has been properly stored into the storing member 16 by the storing mechanism 98 of the recognition machine 90.

Second Embodiment

Herebelow, a second embodiment of the present invention is descried with reference to the drawings. FIGS. 16 to 22 are views showing a money handling system in this embodiment and a money change machine disposed on the money handling system. In the below description about the second embodiment, the same parts as those of the first embodiment are shown by the same reference numbers and detailed description thereof is omitted. More specifically, since a storing member (capsule) 16 used in the second embodiment has the same structure as the storing member 16 used in the first embodiment, description of the storing member 16 is omitted in this embodiment.

Figure 16:
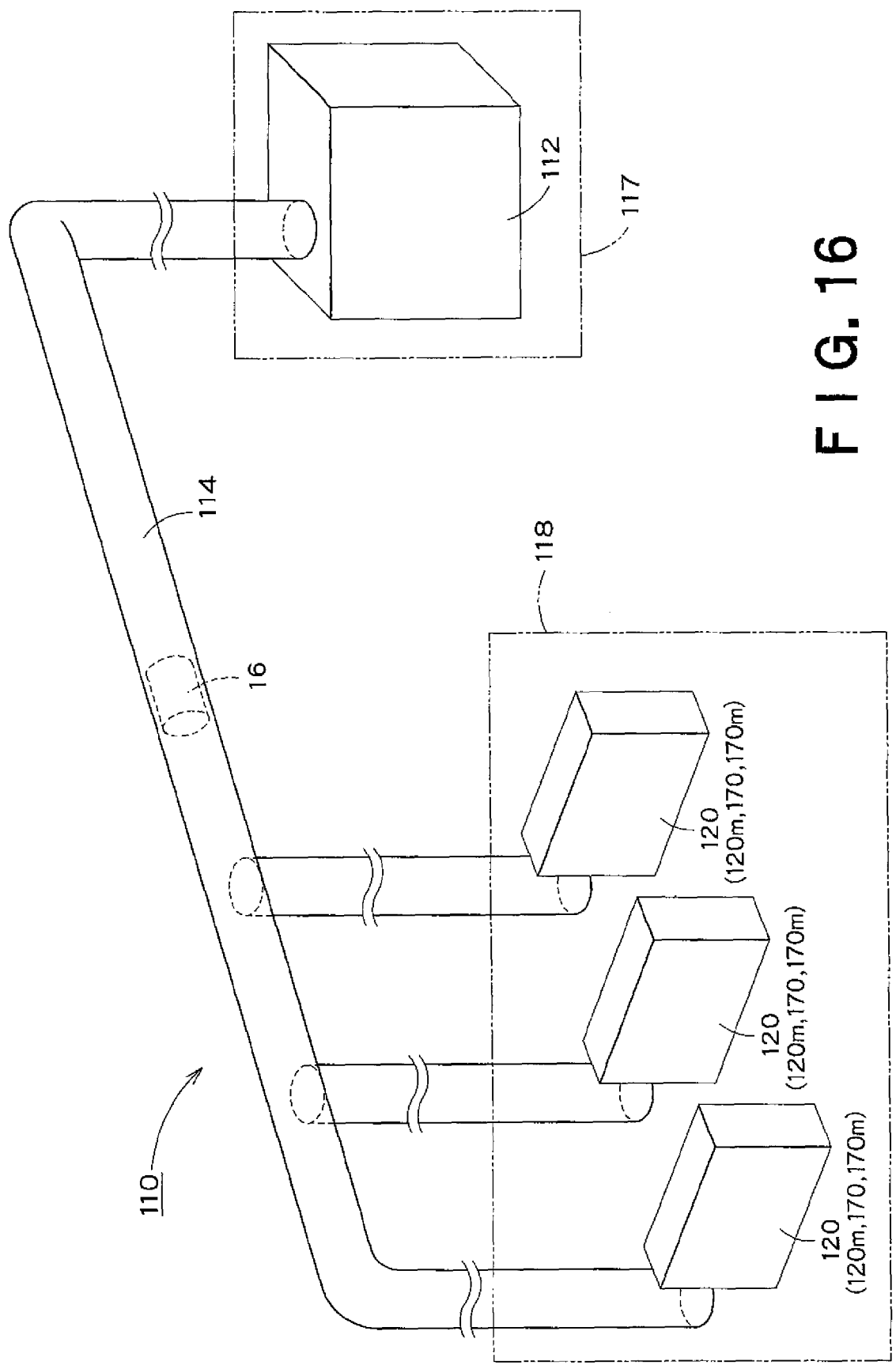
FIG. 16 is a schematic structural view schematically showing a structure of a money handling system according to a second embodiment of the present invention.

A structure of a money handling system 110 in the second embodiment is firstly described with reference to FIG. 16. As shown in FIG. 16, a cash room 117 includes a safe 112, and a resister line 118 located on a position separated from the cash room 117 includes a plurality of money change machines 120. A pneumatic tube (pneumatic tube system) 114 is disposed between the respective money change machines 120 and the safe 112. More specifically, the pneumatic tube 114 has an air tube connected to the respective money change machines 120 and the safe 112. The cylindrical storing member (capsule) 16 storing a paper sheet, such as a banknote, a valuable document and so on, or a coin is transported in the air tube between the respective money change machines 120 and the safe 112 by means of a pneumatic pressure.

In more detail, in order that a banknote, a coin ad so on are transported from the respective money change machines 120 to the safe 112 so as to collect the banknote, the coin and so on having been transported to the safe 112, for example, a banknote, a coin and so on to be collected are stored into the storing member 16 in the respective money change machines 120, the storing member 16 is transported by the pneumatic tube 114 from the respective money change machines 120 to the safe 112, the banknote, the coin and so on are taken out from the storing member 16 in the cash room 117, and the taken-out banknote, the coin and so on are collected. On the other hand, in order that a banknote, a coin and so on placed in the safe 112 is refilled as a change into the respective money change machines 120, for example, a banknote and a coin to be refilled are stored into the storing member 16 in the safe 112, the storing member 16 is transported by the pneumatic tube 114 from the safe 112 to the respective money change machines 120, the banknote, the coin and so on are taken out from the storing member 16 in the resister line 118, and the taken-out banknote, the coin and so on are stored as a change into the respective money change machines 120.

Next, a concrete structure of the money change machine 120 is described with reference to FIGS. 17 to 21. In FIGS. 17 to 21, there is described a case where a banknote change machine is used as the money change machine 120. A case in which a coin change machine is used as the money change machine 120 will be described later.

As shown in FIG. 17, the money change machine 120 includes a housing 120a of a substantially rectangular parallelepiped shape, an inlet 122 for putting a paper sheet, such as a banknote, a valuable document and so on, from the outside of the housing 120a to the inside thereof, a transport unit 124 disposed inside the housing 120a and configured to transport the paper sheet having been put into the housing 120a, one by one, and an outlet 128 connected to the transport unit 124, for dispensing a paper sheet from the inside of the housing 120a to the outside. As shown in FIG. 17, an end of the pneumatic tube 114 is located near the outside surface of the housing 120a of the money change machine 120.

Alternatively, the end of the pneumatic tube 114 may be attached to the outside surface of the housing 120a of the money change machine 120.

The inlet 122 is provided with a feeding mechanism 122a that feeds the paper sheet having been put into the inlet 122, one by one, into the housing 120a. The transport unit 124 is provided with a recognition unit 126. The recognition unit 126 is configured to selectively recognize a paper sheet having been put into the housing 120a. Inside the housing 120a, there are disposed four change storing and feeding units 130. The respective change storing and feeding units 130 are respectively connected to the transport unit 124. A banknote of a specified denomination, among paper sheets having been recognized by the recognition unit 126, is stored by denomination as a change into the respective change storing and feeding units 130. Each of the change storing and feeding units 130 can feed out a banknote stored in the change storing and feeding unit 130 to the transport unit 124.

An escrow unit 132 is disposed inside the housing 120a. The escrow unit 132 is connected to the transport unit 124. A paper sheet, which has been put into the housing 120a through the inlet 122 and recognized by the recognition unit 126, is escrowed in the escrow unit 132. In addition, the escrow unit 132 can feed out a paper sheet escrowed in the escrow unit 132 to the transport unit 124.

Each of the change storing and feeding units 130 and the escrow unit 132 include a storing and feeding mechanism of a drum type. To be more specific, each of the change storing and feeding units 130 and the escrow unit 132 have a drum capable of being rotated in a forward direction and a rearward direction, and a pair of tapes are reeled up by the drum. Paper sheets, which have been sent from the transport unit 124 to each of the change storing and feeding units 130 or the escrow unit 132, are sandwiched between the pair of tapes and sequentially reeled up, one by one, so as to be stored. On the other hand, when a paper sheet is fed out, the drum is rotated in a direction opposite to the direction in which the paper sheet is stored, so that the pair of tapes reeled up on the drum are released from this drum, whereby the paper sheets sandwiched between the pair of tapes are fed out, one by one, to the transport unit 124.

The respective change storing and feeding units 130 and the escrow unit 132 are not limited to units having the above structure which is formed of a drum and a pair of tapes, in which a paper sheet sandwiched between the pair of tapes is reeled up together with the pair of tapes by the drum, and the respective change storing and feeding units 130 and the escrow unit 132 may have another structure. For example, the respective change storing and feeding units 130 and the escrow unit 132 may be of a stacker type.

Inside the housing 120*a*, a storing mechanism 140 is connected to the transport unit 124. The storing mechanism 140 is configured to store a paper sheet having been sent thereto from the transport unit 124, into the storing member 16 waiting at the end of the pneumatic tube 114 near the money change machine 120 so as to be transported by the pneumatic tube 114. In more detail, the storing mechanism 140 is connected to the end of the pneumatic tube 114. The pneumatic tube 140 is configured to transport the storing member 16 into which a paper sheet has been stored by the storing mechanism 140, directly to the pneumatic tube 114. Various structural examples of the storing mechanism 140 are described with reference to FIGS. 18 to 20.

FIG. 18 shows one structural example of the storing mechanism 140. As shown in FIG. 18, the storing mechanism 140 has a pair of upper and lower transport belts 142. A paper sheet S having been sent from the transport unit 124 to the storing mechanism 140 are stacked in a stacked state between the pair of upper and lower transport belts 142. Each of the transport belts 142 is formed of an endless circulation belt extended between a pair of rollers. When one of the pair of rollers is driven in rotation, each of the transport belts 142 is circulated in the direction shown by the arrows in FIG. 18. After one or a plurality of paper sheet(s) S is (are) stacked in a stacked state between the pair of upper and lower transport belts 142, the respective transport belts 142 are circulated in the direction shown by the arrows in FIG. 18 so that the one or the plurality of paper sheet(s) S is (are) collectively transported to the storing member 16 waiting at the end of the pneumatic tube 114 near the money change machine 120 so as to be stored into the storing member 16.

FIG. 19 shows another structural example of the storing mechanism 140. As shown in FIG. 19, the storing mechanism 140 includes a stacking wheel 144 having a plurality of flexible vanes disposed on an outer circumferential surface thereof, an opposed roller 146 disposed oppositely to the stacking wheel 144, a stacking unit 148 in which a paper sheet S is temporarily stacked, and a pushing member 150 configured to push the paper sheet S stacked in the stacking unit 148 toward the pneumatic tube 114. The paper sheets S having been sent from the transport unit 124 to the storing mechanism 140 pass through a gap between the stacking wheel 144 and the opposed roller 146 so as to be stacked in a stacked state in the stacking unit 148. At this time, since the vanes of the stacking wheel 144 taps rear end edges of the paper sheets S, the paper sheets are aligned in the stacking unit 148. After the one or the plurality of paper sheets S have been stacked in a stacked state in the stacking unit 148, the pushing member 150 is moved in the direction shown by the arrow of FIG. 19 to push the stacked paper sheet(s) toward the pneumatic tube 114, so that the one or the plurality of paper sheets S are collectively transported to the storing member 16 waiting at the end of the pneumatic tube 114 near the money change machine 120 so as to be stored into the storing member 16.

Figure 20:
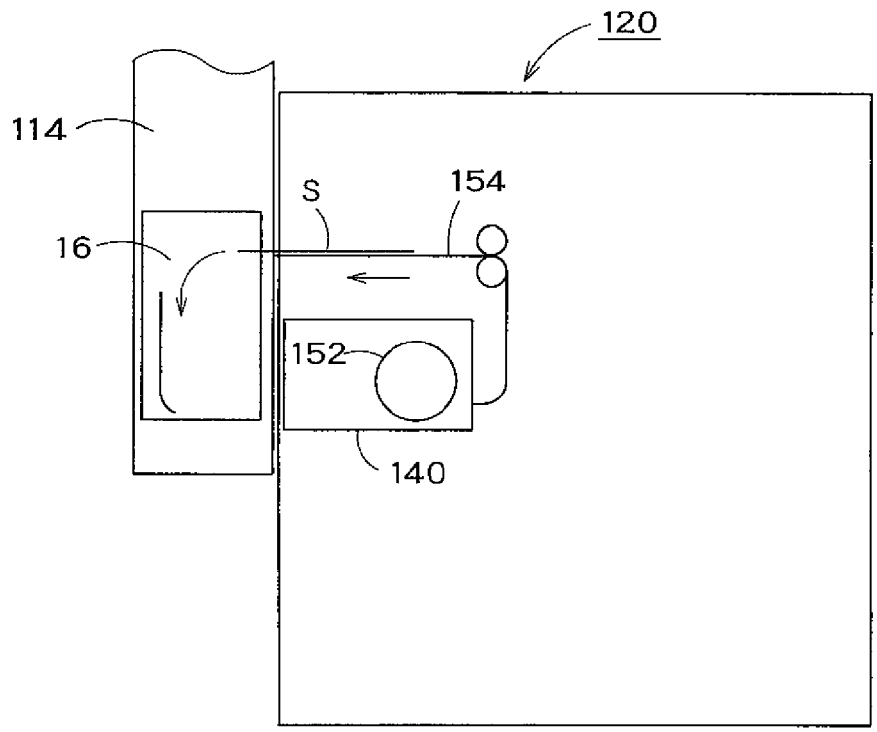
FIG. 20 is a structural view showing still another structure of the storing mechanism of the money change machine shown in FIG. 17.

FIG. 20 shows still another structural example of the storing mechanism 140. As shown in FIG. 20, the storing mechanism 140 includes a storing and feeding mechanism 152 of a drum type and a transport mechanism 154 configured to transport a paper sheet, one by one, from the storing and feeding mechanism 152 to the pneumatic tube 114. The storing and feeding mechanism 152 has the same structure as the respective change storing and feeding units 130 and the storing and feeding mechanism of the escrow unit 132, and is capable of storing, one by one, a paper sheet S having been sent from the transport unit 124, and of feeding the stored paper sheet S one by one. The paper sheet S having been fed out from the storing and feeding mechanism 152 of a drum type is transported, one by one, by the transport mechanism 154 to the storing member 16 waiting at the end of the pneumatic tube 114 near the money change machine 120, so as to be stored, one by one, into the storing member 16.

The various structural examples of the storing mechanism 140 have been described with reference to FIGS. 18 to 20. However, as long as the storing mechanism 140 can store a paper sheet having been sent thereto from the transport unit 124, into the storing member 16 waiting at the end of the pneumatic tube 114 near the money change machine 120, the storing mechanism 140 may have any structure other than the structures shown in FIGS. 18 to 20.

Figure 21:
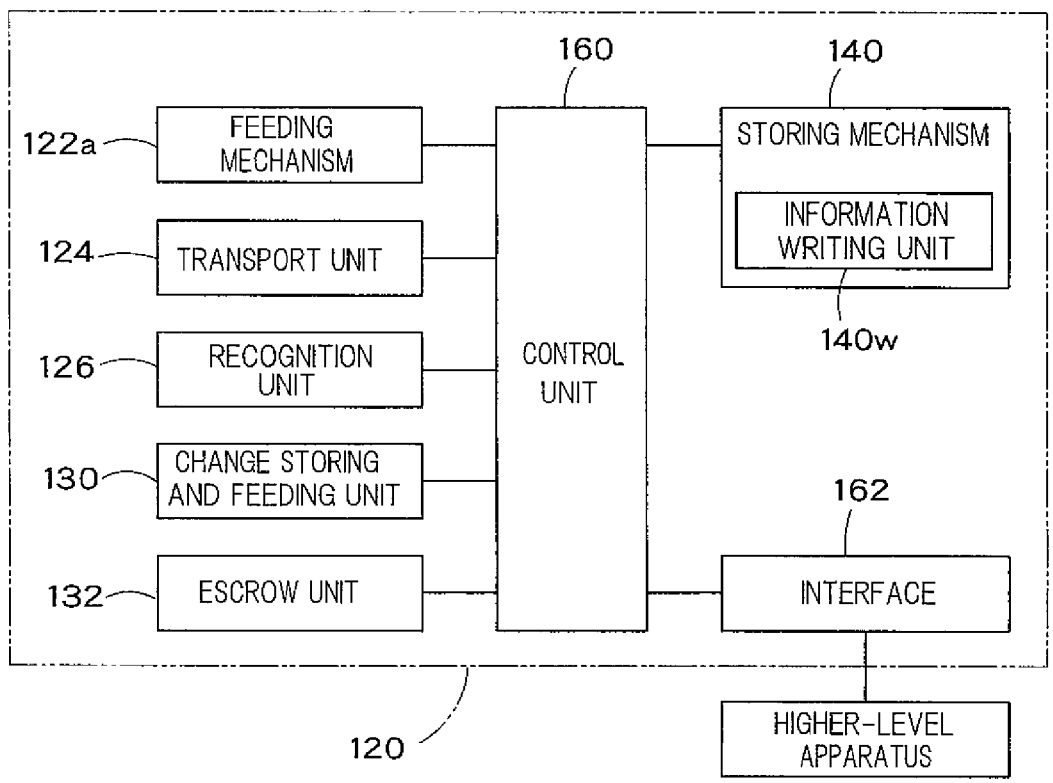
FIG. 21 is a control block view of the money change machine shown in FIG. 17.

As shown in FIG. 21, the money change machine 120 includes a control unit 160. The control unit 160 is disposed inside the housing 120*a*, and is connected to the feeding mechanism 122*a*, the transport unit 124, the recognition unit 126, the change storing and feeding units 130, the escrow unit 132, the storing mechanism 140 and so on. A signal relating to paper-sheet recognition information by the recognition unit 126 is transmitted to the control unit 160, and the control unit 160 transmits instruction signals to the respective constituent elements, such as the feeding mechanism 122*a*, the transport unit 124, the change storing and feeding units 130, the escrow unit 132, the storing mechanism 140 and so on, so as to control these constituent elements. Concrete control contents by the control unit 160 will be described later.

As shown in FIG. 21, an interface 162 is connected to the control unit 160, so that the control unit 160 can send and receive a signal to and from a higher-level apparatus or the like outside the money change machine 120 through the interface 162. For example, the higher-level apparatus may be a POS register disposed in the register line 118, an amount-of-money data management software disposed in the cash room 117, a wireless terminal or the like. In particular, since the control apparatus 160 can send and receive a signal to and from the amount-of-money data management software disposed in the cash room 117 through the interface 162, amount-of-money data information of a paper sheet stored in the storing member 16, which has been sent by the pneumatic tube 114 from the recognition machine 120 to the safe 112, can be transmitted from the register line 118 to the cash room 117. Thus, it is possible to compare amount-of-money data of a paper sheet actually taken out from the storing member 16 in the cash room 117, with amount-of-money data of a paper sheet in the information having been transmitted from the control apparatus 160.

In addition, as shown in FIG. 21, the storing mechanism 140 includes an information wiring unit 140*w* configured to write information into the memory unit 16*m* of the storing member 16. The information writing unit 140*w* is configured to write, into the memory unit 16*m* of the storing member 16, a serial number of the money change machine 120, information of a paper sheet stored in the storing member 16, specifically, a kind of the paper sheet (a banknote, a valuable document (e.g., a check or a coupon), an ID medium (e.g., a receipt) and so on), a denomination (when the paper sheet is a banknote), the number of stored paper sheets by kind, the number of stored banknotes by denomination, information relating to fitness, a serial number and so on.

Next, an operation of the money change machine 120 as structured above and an operation of the money handling system 110 including the money change machine 120 and the pneumatic tube 114 are described.

Figure 22:
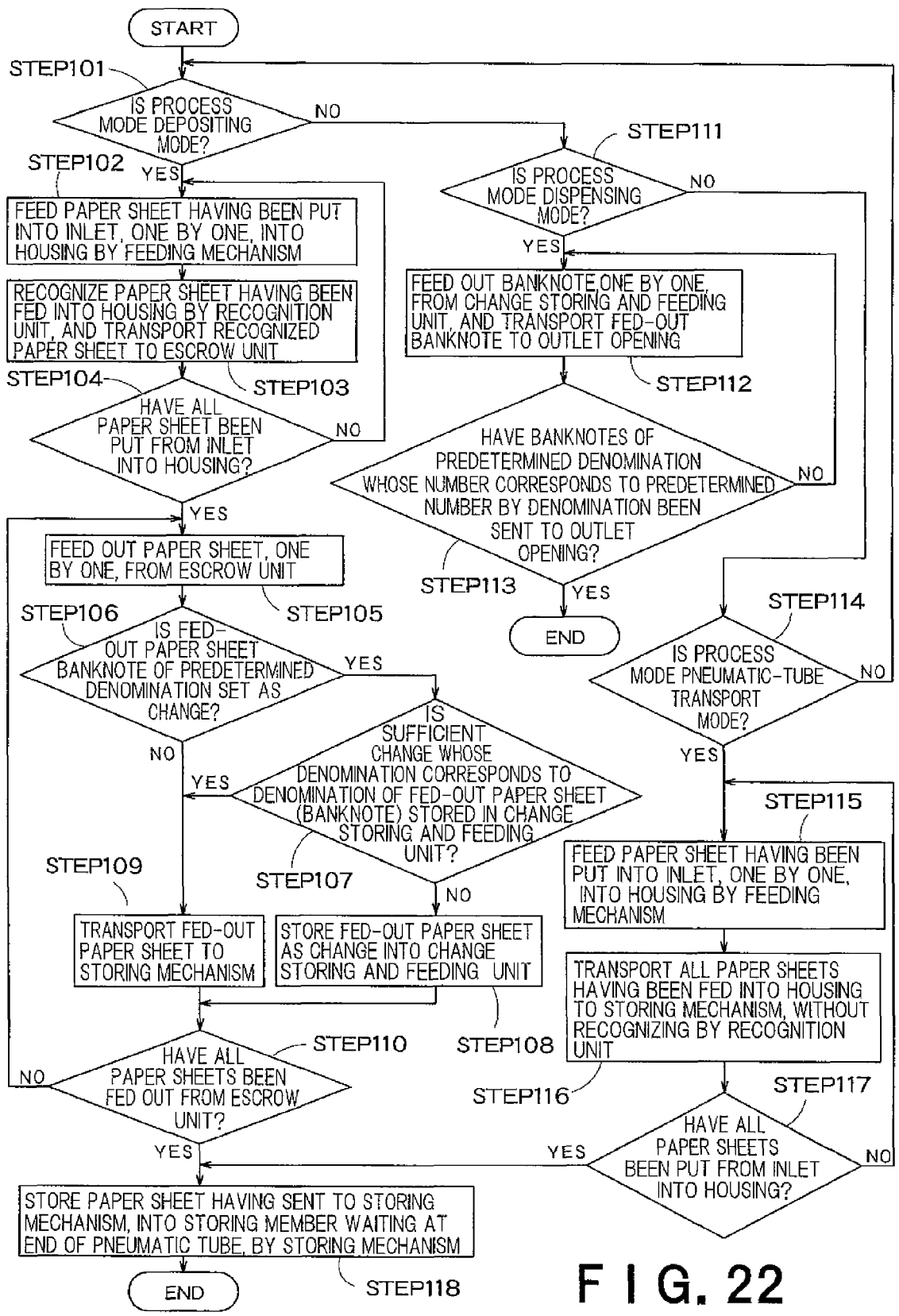
FIG. 22 is a flowchart showing an operation of the money change machine shown in FIG. 17.

The operation of the money change machine 120 is firstly described with reference to FIG. 22. FIG. 22 is a flowchart showing the operation of the money change machine 120.

In the control unit 160 of the money change machine 120, there are previously set, as paper-sheet process modes, a depositing mode, a dispensing mode and a pneumatic-tube transport mode. In the depositing mode, a paper sheet having been put into the housing 120*a* through the inlet 122 is recognized by the recognition unit 126, and the paper sheet is transported to any one of the storing mechanism 140, the change storing and feeding unit 130 and the outlet 128, based on the recognition information by the recognition unit 126. In the dispensing mode, a banknote as a change is fed out from the change storing and feeding unit 130 to the transport unit 124, and the fed-out banknote is transported to the outlet 128. In the pneumatic-tube transport mode, a paper sheet having been put into the housing 120*a* through the inlet 122 is transported directly to the storing mechanism 140, without being recognized by the recognition unit 126. Hereinbelow, the concrete operation of the money change machine 120 is described with reference to the flowchart shown in FIG. 22.

At first, an operator inputs the process mode to be performed through an operation unit (not shown) such as a touch panel or the like disposed on the housing 120*a* of the money change machine 120, for example. The control unit 160 judges which mode corresponds to the process mode having been inputted by the operator. Specifically, when the process mode having been inputted by the operator is the depositing mode ("YES" in STEP 101 of FIG. 22), the following deposit process is performed in the money change machine 120.

When the deposit process is performed in the money change machine 120, the operator firstly puts paper sheets including a banknote, a valuable document an ID medium and so on, into the inlet 122 of the money change machine 120. The number of banknotes by denomination to be stored as a change into the money change machine 120, among the paper sheets having been put thereinto, and a total amount thereof are set by the control unit 160.

After the paper sheets have been put into the inlet 122, the operator gives an instruction for starting the process through the operation unit to the control unit 160. Then, the paper sheets having been put into the inlet 122 are fed out, one by one, by the feeding mechanism 122*a*, to the inside of the housing 120*a* and are transported by the transport unit 124 (STEP 102 of FIG. 22). The paper sheet, which has been fed into the housing 120*a* and transported by the transport unit 124, is recognized by the recognition unit 126, as to its kind (a banknote, a valuable document (e.g., a check or a coupon), an ID medium (e.g., a receipt) and so on), a denomination (when the paper sheet is a banknote), authenticity, fitness, a serial number, and so on. A paper sheet, which could not be recognized by the recognition unit 126, a paper sheet which has been recognized not as a banknote, a valuable document, an ID medium or the like, or a banknote which has been recognized as a counterfeit note is transported as a reject paper sheet to the outlet 128 so as to be taken out from the outlet 128 by the operator. When the paper sheet having been recognized by the recognition unit 126 is not a reject paper sheet, the paper sheet is transported to the escrow unit 132, and is escrowed in the escrow unit 132 (STEP 103 of FIG. 22). After all the paper sheets have been put into the housing 120*a* through the inlet 122 and escrowed in the escrow unit 132 ("YES" in STEP 104 of FIG. 22), the paper sheets are fed out, one by one, from the escrow unit 132 to the transport unit 124 (STEP 105 of FIG. 22).

When the banknote fed out from the escrow unit 132 is a banknote of a predetermined denomination which has been set by the control unit 160 as a change ("YES" in STEP 106 of FIG. 22) and a change corresponding to the denomination of the fed-out paper sheet (banknote) is not yet sufficiently stored in the change storing and feeding unit 130 ("NO" in STEP 107 of FIG. 22), the paper sheet fed out from the escrow unit 132 is stored by denomination as a change into the change storing and feeding unit 130 (STEP 108 of FIG. 22). More specifically, in a case where the control unit 160 sets the process such that one hundred 1,000-yen bills are stored as a change into the money change machine 120, when a paper sheet fed out from the escrow unit 132 is a 1,000-yen bill and the number of 1,000-yen bills stored as a change into the money change machine 120 in this deposit process is smaller than one hundred, the 1,000-yen bill fed out from the escrow unit 132 is stored into the change storing and feeding unit 130 corresponding to a 1,000-yen bill.

On the other hand, even when a paper sheet fed out from the escrow unit 132 is a banknote of a predetermined denomination which has been set by the control unit 160 as a change ("YES" in STEP 106 of FIG. 22), but a change corresponding to the denomination of the fed-out paper sheet (banknote) has been already sufficiently stored in the change storing and feeding unit 130 ("YES" in STEP 107 of FIG. 22), the paper sheet fed out from the escrow unit 132 is transported as an overflow banknote to the storing mechanism 140 (STEP 109 of FIG. 22). More specifically, for example, in a case where the control unit 160 sets the process such that one hundred 1,000-yen bills are stored as a change into the money change machine 120, when a paper sheet fed out from the escrow unit 132 is a 1,000-yen bill and the number of 1,000-yen bills stored into the money change machine 120 as a change in this deposit process has already reached one hundred, the 1,000-yen bill fed out from the escrow unit 132 is transported to the storing mechanism 140.

In addition, even when a change corresponding to the denomination of the paper sheet (banknote) having been fed out from the escrow unit 132 is not yet sufficiently stored in the change storing and feeding unit 130, but the change storing and feeding unit 130 corresponding to the denomination of the banknote is full or nearly full, the paper sheet having been fed out from the escrow unit 132 is transported, not to the change storing and feeding unit 130, but to the storing mechanism 140. Further, when the control unit 160 sets a total amount of banknotes to be stored as a change into the money change machine 120, among the paper sheets having been put thereinto, a banknote exceeding the total amount of banknotes to be stored as a change into the money change machine 120, among the banknotes having been fed out from the escrow unit 132, is transported, not to the change storing and feeding unit 130, but to the storing mechanism 140.

Also when the paper sheet fed out from the escrow unit 132 is not a banknote of a predetermined denomination which has been set as a change by the control unit 160 ("NO" in STEP 106 of FIG. 22), the paper sheet is transported to the storing mechanism 140 (STEP 109 of FIG. 22).

The above operation shown in the STEP 105 to STEP 109 of FIG. 22 is repeated, until all the paper sheets are fed out from the escrow unit 132 ("NO" in STEP 110 of FIG. 22).

After all the paper sheets have been fed out from the escrow unit 132 and transported to the storing mechanism 140, the change storing and feeding unit 130 or the outlet 128 ("YES" in STEP 110 of FIG. 22), the storing mechanism 140 stores the paper sheet having been sent to the storing mechanism 140, into the storing member 16 waiting at the end of the pneumatic tube 114 near the money change machine 120 (STEP 118 of FIG. 22). In this manner, a series of deposit processes in the money change machine 120 are ended.

Next, there is described a case where the process mode inputted by the operator is the dispensing mode. When the process mode inputted by the operator is the dispensing mode ("YES" in STEP 111 of FIG. 22), the following dispense process is performed in the money change machine 120.

When the dispensing mode is set as the process mode by the control unit 160, the operator gives an instruction for starting the process to the control unit 160 through the operation unit. Then, a banknote of a denomination corresponding to the denomination of a change to be dispensed is fed out, one by one, from the change storing and feeding unit 130 to the transport unit 124, and the fed-out banknote is transported by the transport unit 124 to the outlet 128 (STEP 112 of FIG. 22). Such an operation is performed, until banknotes of a predetermined denomination, whose number corresponds to the predetermined number of banknotes by denomination, are sent to the outlet 128 ("NO" in STEP 113 of FIG. 22). After banknotes of a predetermined denomination, whose number corresponds to the predetermined number of banknotes by denomination, have been sent to the outlet 128 ("YES" in STEP 113 of FIG. 22), the change dispense operation is ended. Thereafter, the operator takes out the banknotes as a change from the outlet 128.

Next, there is described a case where the process mode inputted by the operator is the pneumatic-tube transport mode. When the process inputted by the operator is the pneumatic-tube transport mode ("YES" in STEP 114 of FIG. 22), the following process is performed in the money change machine 120.

When the process relating to the pneumatic-tube transport mode is performed in the money change machine 120, the operator firstly puts paper sheets including a banknote, a valuable document, an ID medium and so on, into the inlet 122 of the money change machine 120. After the paper sheets have been put into the inlet 122, the operator gives an instruction for starting the process to the control unit 160 through the operation unit. Then, the paper sheets having been put into the inlet 122 are fed, one by one, by the feeding mechanism 122a into the housing 120, and are transported, one by one, by the transport unit 124 (STEP 115 of FIG. 22). Then, all the paper sheets having been fed into the housing 120a are transported to the storing mechanism 140, without being recognized by the recognition unit 126 (STEP 116 of FIG. 22). Such an operation is performed until all the paper sheets are put from the inlet 122 into the housing 120a ("NO" in STEP 117 of FIG. 22). Then, after all the paper sheets have been put from the inlet 122 into the housing 120a and transported to the storing mechanism 140 ("YES" in STEP 117 of FIG. 22), the storing mechanism 140 stores the paper sheets having been sent to the storing mechanism 140, into the storing member 16 waiting at the end of the pneumatic tube 114 near the money change machine 120 (STEP 118 of FIG. 22). In this manner, the process relating to the pneumatic-tube transport mode in the money change machine 120 is ended.

Next, an operation of the pneumatic tube 114 is described. As shown in STEP 118 of FIG. 22, after the paper sheets have been stored into the storing member 16 waiting at the end of the pneumatic tube 114 near the money change machine 120, the pneumatic tube 114 transports the storing member 16 storing the paper sheets from the money change machine 120 to the safe 112 by means of a pneumatic pressure. Thereafter, in the cash room 117, the paper sheets are taken out from the storing member 16 having been transported to the safe 112, and the taken-out paper sheets are stored into the safe 112. When the amount-of-money data management software connected, for communication, with the control unit 160 of the money change machine 120 is provided, the amount-of-money data of the paper sheets stored in the storing member 16, which has been transmitted from the control unit 160 of the money change machine 120, and the amount-of-money data of the paper sheets actually taken out from the storing member 16 in the cash room 117, are compared to each other.

As described above, according to the money change machine 120 in the second embodiment, there is provided the storing mechanism 140 configured to store a paper sheet(s) having been sent thereto from the transport unit 124, into the storing member 16 to be transported by the pneumatic tube 114. Thus, the paper sheet having been sent from the transport unit 124 is automatically stored into the storing member 16 by the storing mechanism 140, and the storing member 16 storing the paper sheet is transported by the pneumatic tube 114 from the money change machine 120 to another apparatus. Therefore, the operator can transport the paper sheet from the money change machine 120 to the other apparatus by the pneumatic tube 114, without directly touching the paper sheet such as a banknote, a valuable document and so on, whereby the security can be improved.

In addition, in the money change machine 120 in the second embodiment, the storing mechanism 140 is connected to the pneumatic tube 114, and the storing mechanism 140 is configured to directly transport the storing member 16 into which the paper sheet has been stored by the storing mechanism 140, by means of the pneumatic tube 114. Thus, the operator can transport the storing member 16 storing the paper sheet by the pneumatic tube 114, without directly touching the storing member 16.

In addition, in the money change machine 120 in the second embodiment, a paper sheet to be stored into the storing member 16 by the storing mechanism 140 is a paper sheet which is other than a paper sheet to be used as a change in the money change machine 120. Specifically, as a paper sheet to be stored into the storing member 16 by the storing mechanism 140, there are a large denomination banknote, a valuable document (e.g., a check or a coupon), an ID medium (e.g., a receipt) and so on.

In addition, in the money change machine 120 in the second embodiment, the escrow unit 132 is disposed in the housing 120a. The escrow unit 132 is configured to escrow a paper sheet that has been put into the housing 120a through the inlet 122 and recognized by the recognition unit 126 (STEP 103 of FIG. 22). Then, the storing mechanism 140 stores the paper sheet having been sent from the escrow unit 132 into the storing member 16.

In addition, in the money change machine 120 in the second embodiment, the storing member 16 is provided with the memory unit 16m, and the storing mechanism 140 is provided with the information writing unit 140w that is configured to write, into the memory unit 16m, information of a paper sheet which has been stored into the storing member 16 by the storing mechanism 140. To be more specific, the information writing unit 140w is configured to write a serial number of the money change machine 120, information of a paper sheet stored in the storing member 16, specifically, a kind of the paper sheet (a banknote, a valuable document (e.g., a check or a coupon), an ID medium (e.g., a receipt) and so on), a denomination (when the paper sheet is a banknote), the number of stored paper sheets by kind, the number of stored banknotes by denomination, information relating to fitness, a serial number and so on. Thus, when the storing member 16 is sent to the cash room 117 by the pneumatic tube 114, it is possible to read the information written in the memory unit 16m so as to confirm the information of the paper sheet stored in the storing mechanism 16, in the cash room 117. In addition, by comparing the information written in the memory unit 16m and the information having been transmitted from the control unit 160 of the money change machine 120 with each other, amount-of-money data of the paper sheet stored in the storing member 16 can be checked. In addition, by manually inputting details of a paper sheet transported in the pneumatic-tube transport mode, or by reading a bar code on a slip, the information of the paper sheet can be inputted, and the amount-of-money data of the paper sheet can be confirmed in the safe 112 with the use of the inputted information. At this time, the inputted information may be recorded in the memory unit 16m of the storing member 16.

In addition, the money change machine 120 includes the control unit 160. The control unit 160 is configured to execute either one of the modes, i.e., (a) the depositing mode in which a paper sheet having been put into the housing 120a through the inlet 122 is recognized by the recognition unit 126, and the paper sheet is transported to any one of the storing mechanism 140, the change storing and feeding unit 130 and the outlet 128, based on the recognition information by the recognition unit 126 ("YES" in STEP 101 of FIG. 22) and (b) the pneumatic-tube transport mode in which a paper sheet having been put into the housing 120a through the inlet 122 is transported directly to the storing mechanism 140, without being recognized by the recognition unit 126 ("YES" in STEP 114 of FIG. 22). Thus, in order that all the paper sheets are transported from the money change machine 120 to the safe 112 by the pneumatic tube 114, a period of time required for the paper-sheet handling process in the money change machine 120 can be reduced, by selecting the pneumatic-tube transport mode.

In addition, in the money change machine 120 in the second embodiment, the storing member 16 storing a banknote to be used as a change in the money change machine 120 may be transported from an apparatus other than the money change machine 120, specifically, e.g., from the safe 112, to the money change machine 120 by the pneumatic tube 114. In this case, the banknote can be taken out from the storing member 16 having been transported from the safe 112 to the money change machine 120, and the taken-out banknote can be stored as a change into the money change machine 120.

In addition, the money handling system 110 in the second embodiment includes the aforementioned money change machine 120, the pneumatic tube 114 connected to the money change machine 120, and an apparatus other than the money change machine 120, specifically, e.g., the safe 112, connected to the pneumatic tube 114. The storing member 16 is configured to be transported from the money change machine 120 to the other apparatus (safe 112 or the like) by the pneumatic tube 114.

In addition, the money handling method in the second embodiment includes sending, at least, a part of a paper sheet(s), among the paper sheet having been put into the money handling machine 120, to the storing mechanism 140, and storing the paper sheet having been sent to the storing mechanism 140, into the storing member 16 to be transported by the pneumatic tube 114 connected to the money change machine 120, by the storing mechanism 140.

The money change machine 120, the money handling system 110 and the money handling method in the second embodiment are not limited to the above example, but can be variously modified.

For example, when the deposit process is performed in the money change machine 120, instead of the process in which a paper sheet having been recognized by the recognition unit 126 is escrowed in the escrow unit 132, and the paper sheet fed out from the escrow unit 132 is transported to the storing mechanism 140, the change storing and feeding unit 130 or the outlet 128, the paper sheet having been recognized by the recognition unit 126 may be transported directly to the storing mechanism 140, the change storing and feeding unit 130 or the outlet 128, without being transported to the escrow unit 132. In this case, the storing mechanism 140 stores the paper sheet having been directly transported thereto from the recognition unit 126, into the storing member 16.

In addition, as the storing member 16, there may be used the storing member 16 having a plurality of divided storing spaces 16e, 16f and 16g, as shown in FIG. 23. In this case, as shown in FIG. 23, the storing mechanism 140 is configured to be capable of storing paper sheets S into the respective storing spaces 16e, 16f and 16g. Thus, paper sheets S can be stored into the storing member 16 by a kind or denomination, for example, into the storing member 16.

In addition, the money change machine 120 may have a reject opening (not shown) in addition to the outlet 128. In this case, a reject banknote among paper sheets having been recognized by the recognition unit 126 is transported to the reject opening. On the other hand, a banknote having been fed out as a change from the change storing and feeding unit 130 is transported to the outlet 128.

The money change machine 120 in the second embodiment is not limited to a machine having the structure shown in FIG. 17, but can have a structure as shown in FIG. 24. A money change machine 120m shown in FIG. 24 does not have the storing mechanism 140 connected to the pneumatic tube 114 which is shown in FIG. 17. Instead thereof, a storing mechanism 141 connected to the transport unit 124 is used in the housing 120a. The storing mechanism 141 is configured such that the storing member 16 into which a paper sheet has been stored by the storing mechanism 141 can be taken to the outside of the housing 120a. The money change machine 120m shown in FIG. 24 is described in detail below. In the money change machine 120m shown in FIG. 24, the same or similar constituent elements as or to those of the money change machine 120 shown in FIG. 17 are shown by the same reference numbers, and description thereof is omitted.

In the money change machine 120m shown in FIG. 24, a containing unit 138 for containing the storing member 16 is disposed in the housing 120a. The containing unit 138 is accessible from outside the housing 120a through an opening formed in the housing 120a. Thus, the storing member 16 can be stored from outside the housing 120a into the containing unit 138, and the storing member 16 contained in the containing unit 138 can be taken from outside the housing 120a. In addition, an opening of the containing unit 138 may be provided with a shutter (not shown) so as to open and close the opening of the containing unit 138 by this shutter.

The storing mechanism 141 includes a stacking unit 141b in which a paper sheet(s) having been sent thereto from the transport unit 124 is stacked in a stacked state. In addition, the storing mechanism 141 includes a pushing member 141a configured to collectively push a plurality of paper sheets stacked in the stacking unit 141b toward the containing unit 138 (in the direction shown by the arrow in FIG. 24). After a paper sheet(s) has been transported, one by one, from the transport unit 124 to the storing mechanism 141 and the one or the plurality of paper sheets has (have) been stacked in the stacking unit 141b, the pushing member 141a is moved in the direction shown by the arrow in FIG. 24 so that the paper sheet(s) stacked in the stacking unit 141b is (are) pushed toward the containing unit 138, whereby the one or the plurality of paper sheets is (are) stored into the storing member 16 contained in the containing unit 138.

Next, an operation of the money change machine 120m as shown in FIG. 24 is described herebelow.

An operator firstly puts the empty storing member 16 into the containing unit 138. Then, a paper sheet(s) is put into the inlet 122. The paper sheets having been put into the inlet 122 are fed into the housing 120a by the feeding mechanism 122a, and are selectively recognized by the recognition unit 126. A paper sheet(s) other than a banknote to be used as a change in the money change machine 120m is sent from the transport unit 124 to the storing mechanism 141, and the paper sheet is stacked in a stacked state in the stacking unit 141b. Thereafter, after all the paper sheets having been put into the inlet 122 have been fed into the housing 120a and transported to the storing mechanism 141, the change storing and feeding unit(s) 130 or the outlet 128, the pushing member 141a of the storing mechanism 141 is moved in the direction shown by the arrow in FIG. 24, so that the paper sheet stacked in the stacking unit 141b is pushed by the pushing member 141a toward the containing unit 138, whereby the one or the plurality of paper sheets is (are) stored into the storing member 16 contained in the containing unit 138.

After that, the operator takes out the storing member 16 from the containing unit 138, and sets the taken-out storing member 16 in the end of the pneumatic tube 114 near the money change machine 120m. After the storing member 16 has been set in the end of the pneumatic tube 114, the pneumatic tube 114 transports the storing member 16 storing the paper sheet(s) from the money change machine 120m to the safe 112 by means of a pneumatic pressure. Thereafter, in the cash room 117, the paper sheet is taken out from the storing member 16 having been transported to the safe 112, and the taken-out paper sheet is stored into the safe 112.

According to the money change machine 120m as shown in FIG. 24, the storing mechanism 141 is connected to the transport unit 124 in the housing 120a, the storing mechanism 141 is spaced apart from the pneumatic tube 114, and the storing mechanism 141 is configured such that the storing member 16 into which a paper sheet has been stored by the storing mechanism 141 can be taken to the outside of the housing 120a. Thus, the operator can transport the paper sheet, such as a banknote, a valuable document and so on, from the money change machine 120m to another apparatus by the pneumatic tube 114, without directly touching the paper sheet, whereby the security can be improved.

The money change machine of the present invention is not limited to a machine for handling a paper sheet including a banknote, a valuable document and so on. As the money change machine, there is used a machine that handles not a banknote but a coin. Herebelow, a money change machine that dispenses not a banknote but a coin as a change is described with reference to FIG. 25.

As shown in FIG. 25, a money change machine 170 includes a housing 170a of a substantially rectangular parallelepiped shape, an inlet 172 for putting a coin from the outside of the housing 170a to the inside thereof, a feeding unit 173 disposed in the housing 170a and configured to store the coin having been put thereinto from the inlet 172 and to feed out, one by one, the stored coin, and a transport unit 174 disposed inside the housing 170a and configured to transport, one by one, the coin fed out by the feeding unit 173. As shown in FIG. 25, an end of a pneumatic tube 114 is located near the outside surface of the housing 170a of the money change machine 170. Alternatively, the end of the pneumatic tube 114 may be attached to the outside surface of the housing 170a of the money change machine 170.

The transport unit 174 is provide with a recognition unit 176. The recognition unit 176 is configured to selectively recognize a coin having been fed out from the feeding unit 173. In addition, inside the housing 170a, there are disposed, e.g., six change storing and feeding units 180. Coins are sent by denomination to the respective change storing and feeding units 180 from the transport unit 174. A transport belt 175 is disposed below the respective change storing and feeding units 180. When a change dispense process is performed, a coin stored in each of the change storing and feeding units 180 is sent to the transport belt 175. An outlet 178 is disposed on an end of the transport belt 175, so that a coin having been sent from each of the change storing and feeding units 180 to the transport belt 175 is transported by the transport belt 175 to the outlet 178. An operator can take the coin having been sent to the outlet 178 to the outside of the housing 170a.

A reject coin chute 174a is disposed on a downstream side of the recognition unit 176 in the transport unit 174. A coin, which could not be recognized by the recognition unit 176, or a coin, which has been recognized by the recognition unit 176 and judged to be rejected, is sent from the transport unit 174 to the reject coin chute 174a, and is sent directly to the transport belt 175 by the reject coin chute 74a. Namely, the reject coin is sent to the outlet 178, without being stored into the respective change storing and feeding units 180.

Inside the housing 170a, a storing mechanism 182 is connected to a downstream side end of the transport unit 174. The storing mechanism 182 is configured to store a coin having been sent thereto from the transport unit 174, into the storing member 16 waiting at the end of the pneumatic tube 114 near the money change machine 170 so as to be transported by the pneumatic tube 114. In more detail, the storing mechanism 182 is connected to the end of the pneumatic tube 114, and the storing mechanism 182 is configured to transport the storing member 16 into which a coin has been stored by the storing mechanism 182, directly by the pneumatic tube 114.

A structure of the storing mechanism 182 is described more specifically. The storing mechanism 182 is configured to escrow a coin having been sent thereto from the transport unit 174. After all the coins stored in the feeding unit 173 have been fed out from the feeding unit 173, one or a plurality of coins escrowed in the storing mechanism 182 is (are) collectively sent to the storing member 16 by a pushing member (not shown) disposed on the storing mechanism 182.

The money change machine 170 is provided with a control unit (not shown) having the same structure as the control unit 160 of the money change machine 120. This control unit is configured to control the respective constituent elements of the money change machine 170. In the control unit of the money change machine 170, there are previously set, as coin process modes, a depositing mode, a dispensing mode and a pneumatic-tube transport mode. In the depositing mode, a coin having been put into the housing 170a through the inlet 172 is recognized by the recognition unit 176, and the coin is transported to any one of the storing mechanism 182, the change storing and feeding unit 180 and the outlet 178, based on the recognition information by the recognition unit 176. In the dispensing mode, a coin as a change is sent from the change storing and feeding unit 180 to the transport belt 175, and the coin is transported to the outlet 178 by the transport belt 175. In the pneumatic-tube transport mode, a coin having been put into the housing 170a through the inlet 172 is transported directly to the storing mechanism 182, without being recognized by the recognition unit 176. In the processes of the depositing mode, the dispensing mode and the pneumatic-tube depositing mode in the money change machine 170, there are performed operations substantially similar to the processes of the depositing mode, the dispensing mode and the pneumatic-tube transport mode in the money change machine 120 shown in FIG. 17, which are shown in the flowchart of FIG. 22.

Next, an operation of the pneumatic tube 114 is described. After a coin has been stored into the storing member 16 waiting at the end of the pneumatic tube 114 near the money change machine 170, the pneumatic tube 114 transports the storing member 16 storing the coin from the money change machine 170 to the safe 112 by means of a pneumatic pressure. Thereafter, in the cash room 117, the coin is taken out from the storing member 16 having been transported to the safe 112, and the taken-out coin is stored into an apparatus other than the money change machine 170, specifically, e.g., into the safe 112. In addition, in the money change machine 170 shown in FIG. 25, the storing member 16 storing a coin to be used as a change in the money change machine 170 may be transported from an apparatus other than the money change machine 170, specifically, e.g., from the safe 112 to the money change machine 170 by the pneumatic tube 114. In this case, the coin can be taken out from the storing member 16 having been transported from the safe 112 to the money change machine 170, and the taken-out coin can be stored as a change into the money change machine 170.

According to the money change machine 170 as shown in FIG. 25, there is provided the storing mechanism 182 configured to store a coin having been sent thereto from the transport unit 174, into the storing member 16 to be transported by the pneumatic tube 114. Thus, the coin having been sent from the transport unit 174 is automatically stored into the storing member 16 by the storing mechanism 182, and the storing member 16 storing the coin is transported by the pneumatic tube 114 from the money change machine 170 to another apparatus. Thus, the operator can transport the coin from the money change machine 170 to the other apparatus by the pneumatic tube 114, without directly touching the coin, whereby the security can be improved.

The money change machine that dispenses a coin as a change is not limited to a machine having the structure shown in FIG. 25, but can have a structure as shown in FIG. 26. A money change machine 170m shown in FIG. 26 does not have the storing mechanism 182 connected to the pneumatic tube 114 which is shown in FIG. 25. Instead thereof, there is used a storing mechanism 183 spaced apart from the pneumatic tube 114 and connected to the transport unit 174 in the housing 170a. The storing mechanism 183 is configured such that the storing member 16 into which a coin has been stored by the storing mechanism 183 can be taken to the outside of the housing 170a. The money change machine 170m shown in FIG. 26 is described in detail below. In the money change machine 170m shown in FIG. 26, the same or similar constituent elements as or to those of the money change machine 170 shown in FIG. 25 are shown by the same reference numbers, and description thereof is omitted.

In the money change machine 170m shown in FIG. 26, a containing unit 184 for containing the storing member 16 is disposed in the housing 170a. The containing unit 184 is accessible from outside the housing 170a through an opening formed in the housing 170a. Thus, the storing member 16 can be stored from outside the housing 170a into the containing unit 184, and the storing member 16 contained in the containing unit 184 can be taken from outside the housing 170a. In addition, an opening of the containing unit 184 may be provided with a shutter (not shown) so as to open and close the opening of the containing unit 184 by this shutter.

The storing mechanism 183 includes an escrow unit 183b in which a coin having been sent from the transport unit 174 is escrowed. In addition, the storing mechanism 183 includes a pushing member 183a configured to collectively push a plurality of coins escrowed in the escrow unit 183b toward the containing unit 184 (in the direction shown by the arrow in FIG. 26). After a coin(s) having been transported from the transport unit 174 to the storing mechanism 183 has been escrowed in the escrow unit 183b, the pushing member 183a is moved in the direction shown by the arrow in FIG. 26 so that the coin escrowed in the escrow unit 183b is pushed toward the containing unit 184 whereby the one or the plurality of coins is (are) stored into the storing member 16 contained in the containing unit 184.

Next, an operation of the money change machine 170m as shown in FIG. 26 is described herebelow.

An operator firstly puts the empty storing member 16 into the containing unit 184. Then, a coin(s) is put into the inlet 172. The coins having put into the inlet 172 are sent to the feeding unit 173, and are fed out, one by one, from the feeding unit 173 to the transport unit 174, and are selectively recognized by the recognition unit 126. A coin(s) other than a coin to be used as a change in the money change machine 170m is sent from the transport unit 174 to the storing mechanism 183, and is escrowed in the escrow unit 183b of the storing mechanism 183. Thereafter, after all the coins have been fed out from the feeding unit 173 to the transport unit 174, and transported to the storing mechanism 183, the change storing and feeding unit(s) 180 or the outlet 178, the pushing member 183a of the storing mechanism 183 is moved in the direction shown in FIG. 26, so that the coin escrowed in the escrow unit 183b is pushed toward the containing unit 184 by the pushing member 183a, whereby the one or the plurality of coins is (are) stored into the storing member 16 contained in the containing unit 184.

After that, the operator takes out the storing member 16 from the containing unit 184, and sets the taken-out storing member 16 in the end of the pneumatic tube 114 near the money change machine 170m. After the storing member 16 has been set in the end of the pneumatic tube 114, the pneumatic tube 114 transports the storing member 16 storing the coin, from the money change machine 170m to the safe 112 by means of a pneumatic pressure. Thereafter, in the cash room 117, the coin is taken out from the storing member 16 having been transported to the safe 112, and the taken-out coin is stored into the safe 112.

According to the money change machine 170m as shown in FIG. 26, the storing mechanism 183 is connected to the transport unit 174 in the housing 170a, the storing mechanism 183 is spaced apart from the pneumatic tube 114, and the storing mechanism 183 is configured such that the storing member 16 into which a coin has been stored by the storing mechanism 183 can be taken to the outside of the housing 170a. Thus, the operator can transport the coin from the money change machine 170m to another apparatus by the pneumatic tube 114, without directly touching the coin, whereby the security can be improved.

The invention claimed is:

1. A money handling system comprising:
   a money change machine including:
   a housing,
   an inlet for putting a paper sheet from the outside of the housing to the inside thereof, a transport unit disposed inside the housing and configured to transport the paper sheet having been put into the housing through the inlet,
   a first recognition unit disposed on the transport unit and configured to recognize the paper sheet having been put into the housing through the inlet,
   a change storing and feeding unit disposed inside the housing and configured to store, as a change, a banknote of a specific denomination among the paper sheet having been recognized by the first recognition unit, and to feed out the stored banknote to the transport unit,
   and an outlet connected to the transport unit, for dispensing a paper sheet from the inside of the housing to the outside thereof;
   a pneumatic tube configured to transport a storing member for the pneumatic tube;
   a recognition machine provided separately from the money change machine and connected to the pneumatic tube, the recognition machine including:
   a second recognition unit configured to recognize a paper sheet having been put into the recognition machine,
   and a storing mechanism configured to store the paper sheet having been recognized by the second recognition unit, into the storing member for pneumatic tube to be transported by the pneumatic tube; and
   a control unit to which information relating to the paper sheet stored in the change storing and feeding unit of the money change machine and information relating to a paper-sheet recognition result by the second recognition unit of the recognition machine are respectively transmitted, the control unit being configured to calculate a deposit amount of the paper sheet by adding up the former information and the latter information.

2. The money handling system according to claim 1 further comprising a notification unit provided to the control unit and configured to give a notice to an operator,
   wherein:
   an unacceptable kind of a paper sheet and/or an unacceptable denomination of a banknote have/has been previously set in the money change machine;
   when a paper sheet of this kind or denomination is recognized by the first recognition unit, the paper sheet is dispensed to the outside of the money change machine; and
   at this time, the control unit controls the notification unit so as to notify that the paper sheet having been dispensed to the outside of the money change machine is to be put into the recognition machine.

3. The money handling system according to claim 1, wherein
   until the deposit amount of the paper sheet is calculated by the control unit, the banknote stored in the change storing and feeding unit is not dispensed as a change to the outside of the money change machine.

4. The money handling system according to claim 1, wherein
   the control unit is disposed away from the money change machine and the recognition machine.

5. The money handling system according to claim 1, wherein
   the control unit is disposed inside the housing of the money change machine.

6. The money handling system according to claim 1, wherein
   the control unit is provided with a memory unit, and
   the control unit is configured to cause the memory unit to record a total amount of the banknote having been recognized by the second recognition unit of the recognition machine.

7. The money handling system according to claim 1, wherein
   the storing member for the pneumatic tube is provided with a memory unit, and
   the recognition machine is provided with an information writing unit configured to write, into the memory unit, the paper-sheet recognition information by the second recognition unit of the recognition machine.

8. The money handling system according to claim 1, wherein
   the storing member for the pneumatic tube includes a plurality of divided storing spaces, and
   the storing mechanism of the recognition machine is configured to store paper sheets respectively into the storing spaces of the storing member for pneumatic tube.

9. The money handling system according to claim 1, wherein
   the storing member for the pneumatic tube storing money to be used as a change in the money change machine is transported by the pneumatic tube, from an apparatus other than the money change machine to a position near the recognition machine.

10. A money handling system comprising:
    a money change machine including:
    a housing,
    an inlet for putting a paper sheet from the outside of the housing to the inside thereof,
    a transport unit disposed inside the housing and configured to transport the paper sheet having been put into the housing through the inlet,
    a first recognition unit disposed on the transport unit and configured to recognize the paper sheet having been put into the housing through the inlet,
    a change storing and feeding unit disposed inside the housing and configured to store, as a change, a banknote of a specific denomination among the paper sheet having been recognized by the first recognition unit, and to feed out the stored banknote to the transport unit,
    and an outlet connected to the transport unit, for dispensing a paper sheet from the inside of the housing to the outside thereof;
    a pneumatic tube configured to transport a storing member for the pneumatic tube;
    a recognition machine provided separately from the money change machine and connected to the pneumatic tube, the recognition machine including:
    a second recognition unit configured to recognize a paper sheet having been put into the recognition machine,
    and a storing mechanism configured to store the paper sheet having been recognized by the second recognition unit, into the storing member for pneumatic tube to be transported by the pneumatic tube; and
    a control unit to which information relating to the paper sheet having been dispensed from the money change machine and information relating to a paper-sheet recognition result by the second recognition unit of the recognition machine are respectively transmitted, the control unit being configured to judge whether or not the former information and the latter information conform to each other.

11. The money handling system according to claim 10, wherein:
 the control unit is configured to control the pneumatic tube; when the information relating to the paper sheet having been dispensed from the money change machine and the information relating to the paper-sheet recognition result by the second recognition unit of the recognition machine do not conform to each other, the control unit controls the pneumatic tube such that the storing member for the pneumatic tube is not transported.

12. The money handling system according to claim 10 further comprising a notification unit provided to the control unit and configured to give a notice to an operator,
 wherein:
 in the money change machine, a paper sheet other than a banknote to be used as a change in the money change machine, among the paper sheet having been put into the money change machine, is dispensed to the outside of the money change machine, after the deposit amount of the banknote has been confirmed in the money change machine; and
 at this time, the control unit controls the notification unit so as to notify that the paper sheet having been dispensed to the outside of the money change machine is to be put into the recognition machine.

13. A money handling method comprising:
 putting a paper sheet including a banknote to be used as a change in a money change machine, into the money change machine;
 recognizing the paper sheet having been put into the money change machine, by a first recognition unit of the money change machine;
 recognizing a paper sheet other than the banknote to be used as a change in the money change machine, by a second recognition unit of a recognition machine provided separately from the money change machine;
 storing the paper sheet having been recognized by the second recognition unit of the recognition machine, into a storing member for the pneumatic tube;
 transporting the storing member for the pneumatic tube storing the paper sheet, to an apparatus other than the money change machine, by the pneumatic tube; and
 calculating a deposit amount of the paper sheet by adding up information relating to the paper sheet stored in the money change machine and information relating to a paper-sheet recognition result by the second recognition unit of the recognition machine.

\* \* \* \* \*